(12) United States Patent
Saito

(10) Patent No.: US 7,916,585 B2
(45) Date of Patent: Mar. 29, 2011

(54) OPTICAL DISC DRIVE AND METHOD OF CONTROLLING FOCAL POSITION

(75) Inventor: Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 11/846,855

(22) Filed: Aug. 29, 2007

(65) Prior Publication Data

US 2008/0068959 A1     Mar. 20, 2008

(30) Foreign Application Priority Data

Sep. 14, 2006   (JP) ................................ P2006-249806

(51) Int. Cl.
*G11B 7/00* (2006.01)

(52) U.S. Cl. ............... 369/44.27; 369/44.32; 369/44.38; 369/47.55; 369/53.19; 369/53.37; 369/103; 369/112.29

(58) Field of Classification Search .................. None
See application file for complete search history.

(56) References Cited

U.S. PATENT DOCUMENTS

| | | | | |
|---|---|---|---|---|
| 2002/0015376 A1* | 2/2002 | Liu et al. | ...................... | 369/103 |
| 2005/0030875 A1* | 2/2005 | Horimai | ...................... | 369/103 |
| 2005/0122860 A1* | 6/2005 | Koyama | ...................... | 369/44.32 |
| 2005/0180277 A1* | 8/2005 | Iijima et al. | ................ | 369/44.32 |
| 2005/0207303 A1* | 9/2005 | Yonezawa | ................. | 369/53.19 |

FOREIGN PATENT DOCUMENTS

| | | |
|---|---|---|
| JP | 62-217427 | 9/1987 |
| JP | 63-103443 | 5/1988 |
| JP | 2005-32309 | 2/2005 |

OTHER PUBLICATIONS

Machine translation of JP2000-155968A into English, Arai.*

* cited by examiner

*Primary Examiner* — Wayne R Young
*Assistant Examiner* — Brian Butcher
(74) *Attorney, Agent, or Firm* — Oblon, Spivak, McClelland, Maier & Neustadt, L.L.P.

(57) ABSTRACT

An optical disc drive for recording and/or reading information on or from an optical disc is disclosed. The optical disc drive includes: a position controller which controls the position of the objective lens based on the position-controlling light beam reflected by the reflective surface by condensing the position-controlling light beam by the objective lens such that the position-controlling light beam is brought to a focus at a target guide position on the reflective surface corresponding to the target recording position; a tilt angle detector which detects tilt angle of the optical disc relative to optical axis of the position-controlling light beam; and a focal position corrector which makes a correction such that a focal position obtained when the information light beam is condensed by the objective lens is aligned to the target recording position according to the tilt angle.

10 Claims, 21 Drawing Sheets

RELATED ART

OPTICAL DISC DRIVE AND METHOD OF CONTROLLING FOCAL POSITION

CROSS REFERENCES TO RELATED APPLICATIONS

The present invention contains subject matter related to Japanese Patent Application JP2006-249806 filed in the Japanese Patent Office on Sep. 14, 2006, the entire contents of which being incorporated herein by reference.

BACKGROUND OF THE INVENTION

1. Field of the Invention

The present invention relates to an optical disc drive and method of controlling the focal position and is adapted to be applied, for example, to an optical disc drive for recording a hologram onto an optical disc.

2. Description of the Related Art

Heretofore, optical disc drives for reading information by directing a light beam at an optical disc (such as a CD (compact disc), DVD (digital versatile disc), or Blu-ray disc (trademark registered, hereinafter abbreviated BD)) and reading the reflected light have enjoyed wide acceptance.

Furthermore, in such a related-art optical disc drive, the reflectivity on the optical disc is locally varied by illuminating the disc with a light beam, thus recording information.

It is known that the size of the optical spot formed on this optical disc is roughly given by $\lambda/NA$ (where $\lambda$ is the wavelength of the light beam and NA is the numerical aperture) and that the resolution is in proportion to this value. For example, details of the BD technology capable of recording about 25 GB of data onto an optical disc having a diameter of 120 mm are described in Y. Kasami, Y. Kuroda, K. Seo, O. Kawakubo, S. Takagawa, M. Ono, and M. Yamada, Jpn. J. Appl. Phys. 39, 756 (2000) (non-patent reference 1).

Various kinds of information such as various kinds of multimedia-rich contents (e.g., music contents and video contents) and various kinds of data for computers are recorded on optical discs. Especially, in recent years, the amounts of information have increased because of improved resolution of videos and improved sound quality of music contents. Furthermore, increase in the number of contents recorded on one optical disc tends to be required. Therefore, there is a demand for a further increase in the storage capacity of the optical disc.

Accordingly, a technique for increasing the recording capacity of one optical disc by stacking plural recording layers within the single disc has also been proposed (see, for example, I. Ichimura et al., Technical Digest of ISOM, '04, p. 52, Oct. 11-15, 2005, Jeju, Korea (non-patent reference 2)).

On the other hand, an optical disc drive using holography has been proposed as a technique for recording information on an optical disc (see, for example, R. R. McLeod et al., "Microholographic multilayer optical disk data storage," Appl. Opt., Vol. 44, 2005, p. 3197 (non-patent reference 3)).

For example, as shown in FIG. 1, an optical disc drive, indicated by reference numeral 1, uses an optical disc 8 made of photopolymer whose refractive index varies with the intensity of the light impinging on the disc. A light beam from an optical head 7 is once focused onto the disc 8. Then, the beam is again focused at the same focal position from the reverse direction using a reflector 9 mounted on the rear side (lower side as viewed in FIG. 1) of the optical disc 8.

In the optical disc drive 1, a light beam made of laser light is emitted from a laser 2 and the optical wave is modulated by an acoustooptic modulator 3. The beam is then converted into collimated light by a collimator lens 4. Subsequently, the light beam is transmitted through a polarizing beam splitter 5, and is converted from linear polarization to circular polarization by a ¼ wave plate 6. Then, the beam is made to hit the optical head 7.

The optical head 7 is designed to be capable of recording and reading information. The head reflects the light beam by means of a mirror 7A. The beam is condensed by an objective lens 7B and directed at the optical disc 8 rotated by a spindle motor (not shown).

At this time, the light beam is once brought to a focus inside the optical disc 8 and then reflected by the reflector 9 disposed on the rear side of the optical disc 8. The beam is focused at the same focal point inside the optical disc 8 from the rear side of the disc 8. The reflector 9 is made up of a condenser lens 9A, a shutter 9B, a condenser lens 9C, and a reflective mirror 9D.

As a result, as shown in FIG. 2A, stationary waves are produced at the focal position of the light beam, resulting in a recording mark RM made of a hologram of a small light spot size. As a whole, the mark assumes a form obtained by bonding together two cones at their bottoms. Thus, the recording mark RM is recorded as a piece of information.

When the recording mark RM is recorded plurally inside the optical disc 8, the optical disc drive 1 rotates the disc 8 and arranges the recording marks RM along coaxial or spiral tracks, thus forming one mark recording layer. Furthermore, the recording marks RM can be recorded in such a way that plural mark recording layers are stacked by adjusting the focal position of the light beam.

Consequently, the optical disc 8 has a multilayer structure having plural mark recording layers therein. For example, as shown in FIG. 2B, in the optical disc 8, the distance p1 (mark pitch) between the recording marks RM is 1.5 µm. The distance p2 (track pitch) between the adjacent tracks is 2 µm. The distance p3 between the adjacent layers is 22.5 µm.

In the optical disc drive 1, when information is read from the disc 8 on which the recording marks RM have been recorded, the shutter 9B of the reflector 9 is closed to prevent the light beam from being emitted from the rear side of the optical disc 8.

At this time, the optical disc drive 1 directs the light beam at any one of the recording marks RM within the optical disc 8 by the optical head 7. The readout light beam produced from the recording mark RM is made to hit the optical head 7. The readout light beam is converted from circular polarization into linear polarization by the ¼ wave plate 6 and reflected by the polarizing beam splitter 5. The readout light beam is condensed by the condenser lens 10 and made to hit the photodetector 12 via the pinhole 11.

At this time, the optical disc drive 1 detects the amount of light of the readout light beam by the photodetector 12 and reads out the information based on the result of the detection.

Furthermore, an optical disc drive using different kinds of light beams between the position control of the objective lens and recording/reading of information has also been proposed (see, for example, S-K Park, T. D. Milster, T. M. Miller, J. Buts and W. Bletscher, Jpn. J. Appl. Phys., Vol. 44 (2005) pp. 3442-3444 (non-patent reference 4)).

For example, as shown in FIG. 3, an optical disc drive 15 emits a position-controlling light beam L1 to an optical disc 18 via a beam splitter 16 and an objective lens 17.

In addition, the optical disc drive 15 controls the position. That is, the drive detects the returning light that is reflection of the position-controlling light beam L1 at the reflective surface 18A of the optical disc 18, and controls the focus of the objective lens 17 and the tracking according to the results of the detection. In this way, the position-controlling light beam L1 is brought to a focus onto a desired track on the reflective surface 18A.

Under this condition, in the optical disc drive 15, a recording/reading (write/read) light beam L2 different from the position-controlling light beam L1 is reflected by the beam splitter 16 and brought to a focus onto a recording layer 182 of the disc 18 via the objective lens 17 whose position is controlled. Thus, information (such as recording marks RM) is recorded or read out.

SUMMARY OF THE INVENTION

In the optical disc drive 15, when the optical disc 18 is in an ideal condition, i.e., the disc is not tilted as shown in FIG. 4A, and the position-controlling light beam L1 is focused at a point T1 corresponding to a desired track on the reflective surface 18A, the recording/reading light beam L2 is brought to a focus at a point U1 that is a desired recording position within the recording layer 18B. In this case, the straight line passing through the points T1 and U1 is perpendicular to the surface of the optical disc 18.

However, in the optical disc drive 15, there is the possibility that the optical disc 18 wobbles due to the physical characteristics of the disc. At this time, the disc 18 is tilted radially compared with the ideal state.

If the radial tilt occurs at this time, the optical disc drive 15 tilts the optical axis of the position-controlling light beam L1 and recording/reading light beam L2 through an angle of α relative to the surface of the optical disc 18 as shown in FIG. 4B.

In this case, if the position-controlling light beam L1 is brought to a focus at the point T1, the optical disc drive 15 brings the recording/reading light beam L2 to a focus at a point U2 spaced from the point U1 by a distance of Δy. It follows that information (such as the recording marks RM) is recorded at positions different from desired recording positions or that information held at positions different from the desired recording positions is read out.

That is, the optical disc drive 15 has the problem that when the optical disc 18 tilts, the accuracy at which information is recorded and read may deteriorate.

In view of the foregoing circumstances, it is desirable to provide an optical disc drive capable of recording and reading information at improved accuracy when the optical disc has tilted. Also, it is desirable to provide a focal position control method capable of bringing the focus of the light beam into a target position accurately.

An optical disc drive according to one embodiment of the present invention records and/or reads information on or from an optical disc having at least one recording surface by bringing a light beam carrying information (hereinafter may be referred to as the information light beam) to a focus at a target recording position on the recording surface of the disc by an objective lens, and has a position controller, a tilt angle detector which detects the tilt angle of the optical disc relative to the optical axis of a position-controlling light beam, and a focal position corrector which makes a correction such that a focal position obtained when the information light beam is condensed by the objective lens is aligned to the target recording position according to the tilt angle. Position-guiding elements for determining a position at which the information is recorded are formed on the reflective surface of the optical disc. The position controller focuses the position-controlling light beam onto the reflective surface of the optical disc by the objective lens and controls the position of the objective lens such that the position-controlling light beam is focused at a target guide position on the reflective surface corresponding to the target recording position, according to the tilt angle.

Consequently, in the optical disc drive according to one embodiment of the present invention, if the target recording position deviates from the extension line of the optical axis obtained when the position-controlling light beam is focused into the target guide position due to tilt of the optical disc, the optical disc drive of the embodiment of the present invention can correct the focal position of the information light beam according to the angle of the tilt and align the focal position to the target recording position.

Another embodiment of the present invention provides a focal position control method of bringing an information light beam to a focus at a target recording position on a recording surface of an information recording medium by an objective lens. The method starts with condensing a position-controlling light beam onto the reflective surface of the information recording medium by the objective lens. Position guide elements for determining the position at which information is recorded are formed on the reflective surface. The position of the objective lens is controlled based on the reflected light such that the position-controlling light beam is brought to a focus at the target guide position on the reflective surface corresponding to the target recording position. The angle of tilt of the information recording medium relative to the optical axis of the position-controlling light beam is detected. The focal position achieved when the information light beam is condensed by the objective lens is corrected according to the angle of tilt so as to be aligned to the target recording position.

Consequently, in the focal position control method according to one embodiment of the invention, if the target recording position deviates from the extension line of the optical axis obtained when the position-controlling light beam is focused into the target guide position due to tilt of the information recording medium, the focal position of the information light beam can be corrected according to the angle of the tilt and aligned to the target recording position.

According to one embodiment of the present invention, if the target recording position deviates from the extension line of the optical axis obtained when the position-controlling light beam is focused into the target guide position due to tilt of the optical disc, the focal position of the information light beam can be corrected according to the angle of the tilt and aligned to the target recording position. Consequently, an optical disc drive can be realized which can record and read information at improved accuracy when the optical disc has tilted.

According to another embodiment of the invention, if the target recording position deviates from the extension line of the optical axis obtained when the position-controlling light beam is focused into the target guide position due to tilt of the information recording medium, the focal position of the information light beam can be corrected according to the angle of the tilt and aligned to the target recording position. In this way, a focal position control method capable of aligning the focus of the light beam to the target position accurately can be accomplished.

DESCRIPTION OF THE PREFERRED EMBODIMENTS

Embodiments of the present invention are hereinafter described in detail with reference to the drawings.

(1) First Embodiment

(1-1) Structure of Optical Disc

An optical disc 100 used as an information recording medium in the present embodiment is first described.

Figure 5A:
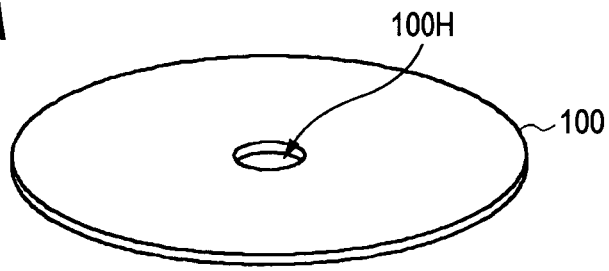
FIG. 5A is an exterior view of an optical disc according to one embodiment of the present invention.

As shown in the exterior view of FIG. 5A, the optical disc 100 is shaped like a disc as a whole in the same way as related-art CDs, DVDs, and BDs. The disc has a diameter of about 120 mm and is centrally provided with a hole 100H.

Figure 5B:
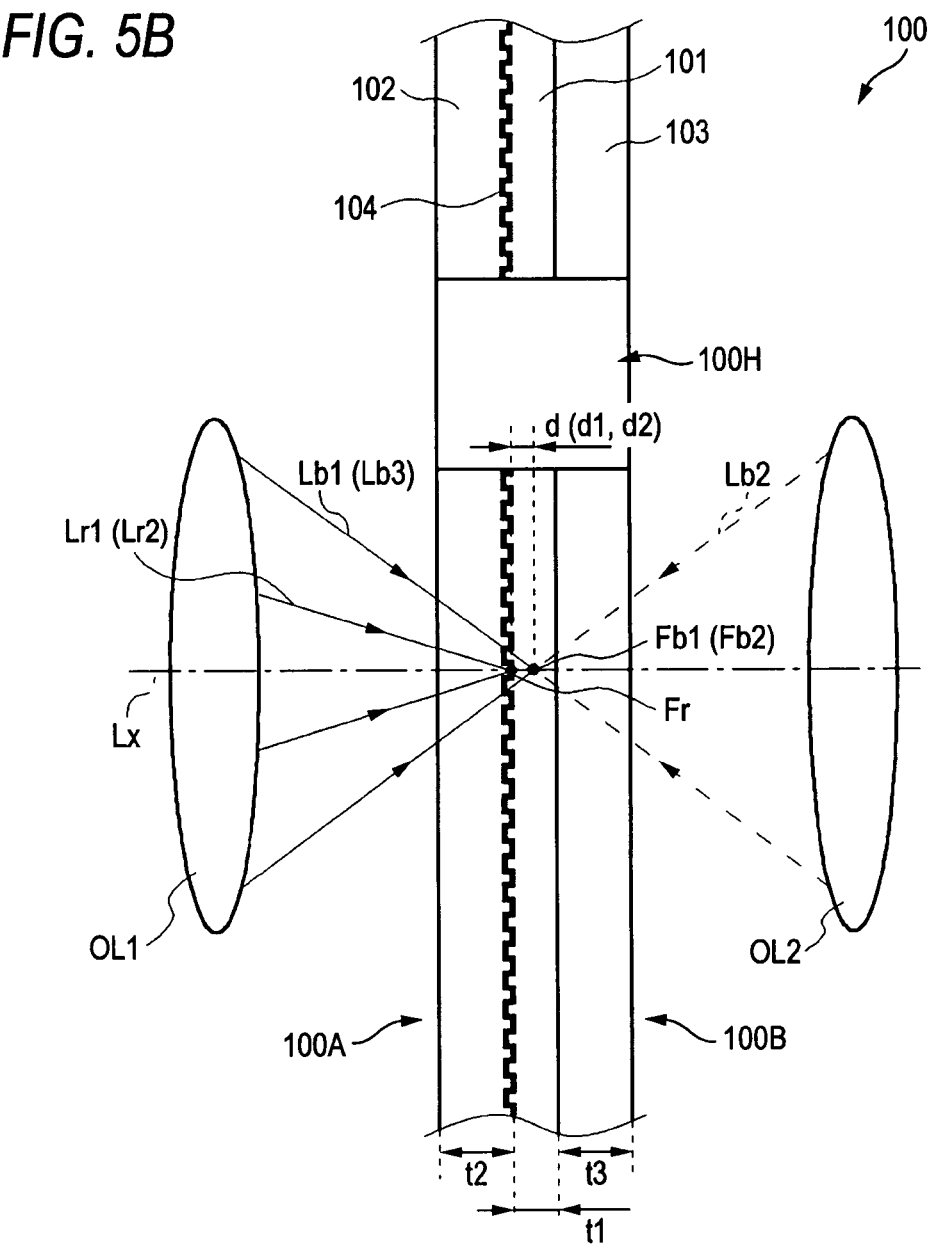
FIG. 5B is a schematic representation of the optical disc shown in FIG. 5A, showing the structure of the disc.

As shown in the cross section of FIG. 5B, the optical disc 100 has in its center a recording layer 101 for recording information. The recording layer 101 is sandwiched between substrates 102 and 103.

The thickness t1 of the recording layer 101 is set to about 0.3 mm. The thicknesses t2 and t3 of the substrates 102 and 103, respectively, are set to about 0.6 mm.

The substrates 102 and 103 are made of polycarbonate, glass, or other material. Light incident on one surface of each substrate is transmitted to the other surface at a high transitivity. The substrates 102 and 103 have some degree of rigidity and act to protect the recording layer 101.

The optical disc 100 is substantially symmetrical with respect to the recording layer 101 in the direction of the thickness. As a whole, the disc is designed to suppress generation of warping or distortion due to aging to a minimum. The surfaces of the substrates 102 and 103 can be antireflectively coated to prevent unwanted reflection.

Figure 1:
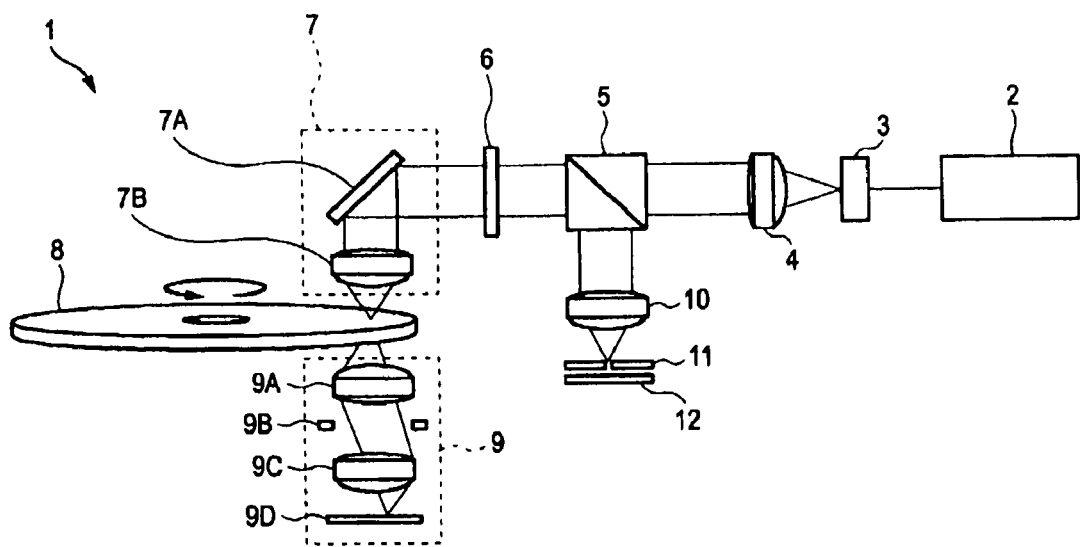
FIG. 1 is a schematic diagram showing the structure of a related-art optical disc drive of the stationary wave recording type.
Figure 2A:
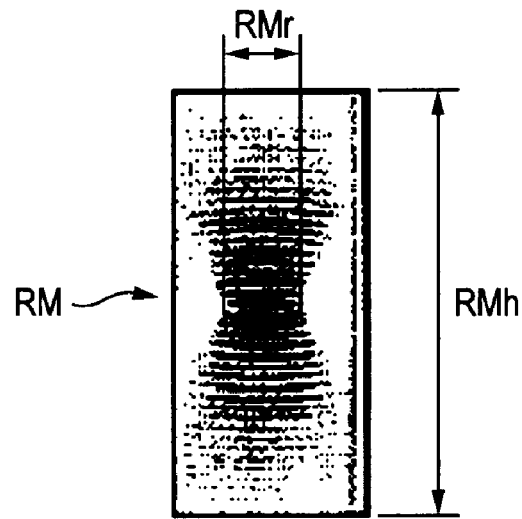
FIG. 2A is a schematic representation of a hologram formed.

The recording layer 101 is made of photopolymer whose refractive index varies with the intensity of light impinging on the photopolymer in the same way as the optical disc 8 (FIG. 1). The recording layer responds to blue light beams having a wavelength of about 405 nm. Where two relatively intense blue light beams Lb1 and Lb2 interfere with each other within the recording layer 101 as shown in FIG. 5B, stationary waves are created in the recording layer 101. As a result, an interference pattern having the property of a hologram as shown in FIG. 2A is created.

Furthermore, the recording layer 101 shows a refractive index close to those of the substrates 102 and 103 for the blue light beams having the wavelength of 405 nm. At the interface between the recording layer 101 and the substrate 103, the blue light beams are little refracted.

The optical disc 100 further includes a reflective transmissive film 104 at the interface between the recording layer 101 and the substrate 102, the film 104 acting as a reflective layer. The reflective transmissive film 104 is made of a dielectric multilayer film. The film 104 transmits the blue light beams Lb1 and Lb2 having the wavelength of 405 nm and a readout blue light beam Lb3, and reflects a red light beam having a wavelength of 660 nm. In this way, the reflective transmissive film 104 has wavelength selectivity.

The reflective transmissive film 104 is provided with guide grooves as position guiders. The guide grooves are used in tracking servo and focus servo. Specifically, spiral tracks are formed by lands and grooves similar to those of a general recordable Blu-ray disc (BD-R). A sequence of addresses is assigned to given successive units of recording on the tracks. Tracks on which information is recorded or from which information is read can be addressed.

Pits may be formed instead of the guide grooves in the reflective transmissive film 104 at the interface between the recording layer 101 and the substrate 102. Alternatively, guide grooves and pits may be combined. In summary, the addresses may be recognized using light beams.

Where a red light beam Lr1 is emitted from the side of the substrate 102 to the reflective transmissive film 104, the film reflects the beam toward the substrate 102. The reflected beam is hereinafter referred to as the reflected red light beam Lr2.

It is assumed that the reflected red light beam Lr2 is used for control of the position of the given objective lens OL1 (i.e., focus control and tracking control) in order to bring the focus Fr of the red light beam Lr1 condensed by the objective lens OL1 into the target track, for example, in an optical disc drive. The target track corresponds to a target guide position and will be hereinafter referred to as the target track.

In the following description, the surface of the optical disc 100 facing the substrate 102 is referred to as the guide surface 100A, while the surface of the disc 100 facing the substrate 103 is referred to as the recording light-illuminated surface 100B.

In practice, when information is recorded on the optical disc 100, the red light beam Lr1 is condensed by the objective lens OL1 whose position is controlled as shown in FIG. 5B. The beam is brought to a focus on the target track on the reflective transmissive film 104.

The blue light beam Lb1 shares its optical axis Lx with the red light beam Lr1 and is condensed by the objective lens OL1. The blue beam Lb1 penetrates through the substrate 102 and reflective transmissive film 104 and is brought to a focus at a position corresponding to the rear side (i.e., the side of the substrate 102) of the desired track within the recording layer 101. At this time, the focus Fb1 of the blue light beam Lb1 is located farther from the focus Fr on the common optical axis Lx relative to the objective lens OL1.

The blue light beam Lb2 sharing the optical axis Lx with the blue light beam Lb1 and having the same wavelength as the blue light beam Lb1 is condensed from the opposite side (i.e., on the side of the substrate 103) of the blue light beam Lb1 by the objective lens OL2 having optical characteristics equivalent to those of the objective lens OL1 and emitted. At this time, the focus Fb2 of the blue light beam Lb2 is made coincident with the focus Fb1 of the blue light beam Lb1 by control of the position of the objective lens OL2.

As a result, in the optical disc 100, a recording mark RM that is a relatively small interference pattern is recorded at the positions of the foci Fb1 and Fb2 corresponding to the rear side of the target track within the recording layer 101.

At this time, the blue light beams Lb1 and Lb2, each of which is a converged light beam, overlap within the recording layer 101. Stationary waves are produced in the portions where the intensity is in excess of a given value. As a result, the recording mark RM is formed. Therefore, as a whole, the recording mark RM assumes a form obtained by bonding together two cones at their bottoms as shown in FIG. 2A. The central portion of the mark (i.e., the bonded bottoms of the cones) is slightly constricted.

Let RMr be the diameter of the central constricted portion of the recording mark RM. The diameter RMr is found from the following Eq. (1).

$$RMr = 1.2 \times \frac{\lambda}{NA} \quad (1)$$

where λ (m) is the wavelength of the blue light beams Lb1 and Lb2 and NA is the numerical aperture of the objective lenses OL1 and OL2.

Let RMh be the height of the recording mark RM. The height RMh can be found from the following Eq. (2).

$$RMh = 4 \times n \times \frac{\lambda}{NA^2} \quad (2)$$

where n is the refractive index of the objective lenses OL1 and OL2.

For example, it is assumed that the wavelength λ is 405 nm, the numerical aperture NA is 0.5, and the refractive index n is 1.5. From Eq. (1), the diameter RMr is found to be equal to 0.97 μm. From Eq. (2), the height RMh is found to be equal to 9.72 μm.

Figure 2B:
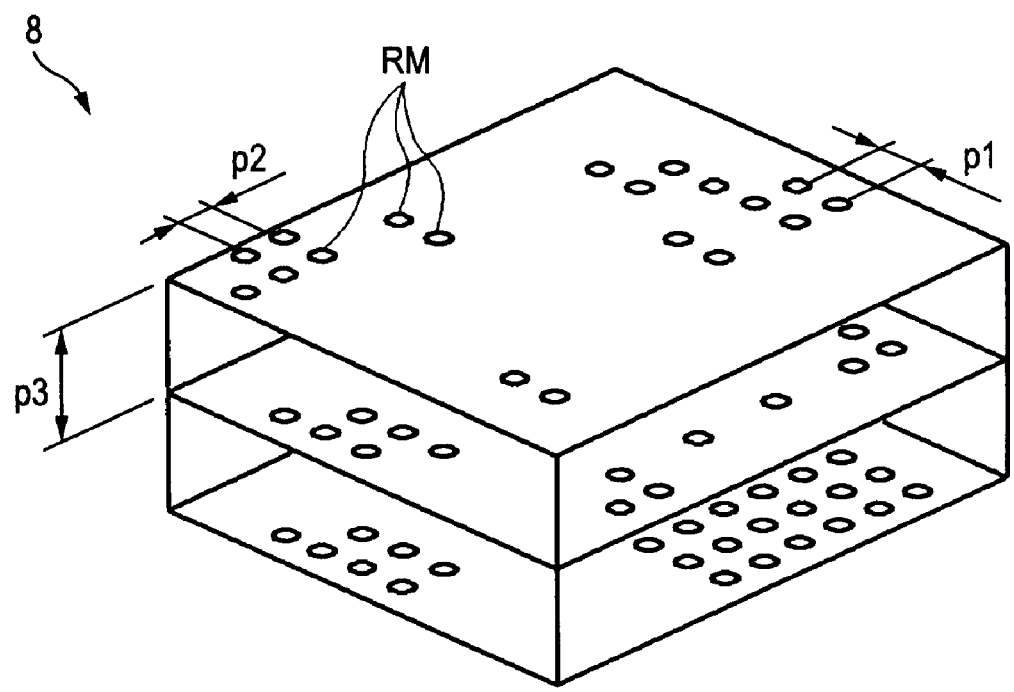
FIG. 2B is a perspective view of an optical disc showing the manner in which the hologram is formed.

Furthermore, the optical disc 100 is so designed that the thickness t1 (=0.3 mm) of the recording layer 101 is suffi-ciently greater than the height RMh of the recording mark RM. The recording mark RM is recorded in the optical disc 100 while the distance (hereinafter referred to as the depth) from the reflective transmissive film 104 within the recording layer 101 is being switched to different values. Consequently, as shown in FIG. 2B, plural mark recording layers are stacked in the direction of the thickness of the optical disc 100. That is, multilayer recording can be made.

In this case, the depth of the recording marks RM is varied by adjusting the depth of the foci Fb1 and Fb2 of the blue light beams Lb1 and Lb2 within the recording layer 101 of the optical disc 100. For example, if the distance p3 between the adjacent mark recording layers is set to about 15 μm while taking account of the interference between the recording marks RM, about 20 mark recording layers can be formed within the recording layer 101. The distance p3 may be set to various values other than about 15 μm while taking account of interference between the recording marks RM.

On the other hand, when information is read from the optical disc 100, the position of the objective lens OL1 is controlled such that the red light beam Lr1 condensed by the objective lens OL1 is brought to a focus on the target track of the reflective transmissive film 104 in the same way as when information is recorded.

Furthermore, the optical disc 100 is so designed that the focus Fb1 of the blue light beam Lb1 transmitted through the substrate 102 and reflective transmissive film 104 via the same objective lens OL1 corresponds to the rear side of the target track within the recording layer 101 and is brought to a focus at a position giving the target depth. This corresponds to the target recording position and is hereinafter referred to as the target mark position.

At this time, the recording mark RM recorded at the position of the focus Fb1 emits the readout blue light beam Lb3 from the recording mark RM recorded at the target mark position because of the nature of a hologram. This readout beam Lb3 is equivalent in optical characteristics to the blue light beam Lb2 emitted during recording of the recording mark RM. The readout beam Lb3 travels in the same direction as the blue light beam Lb2, i.e., moves toward the substrate 102 from inside the recording layer 101 while diverging.

In this way, the optical disc 100 is so designed that, when information is recorded, the recording mark RM is formed as the information at the position where the foci Fb1 and Fb2 overlap in the recording layer 101 because of the use of the red light beam Lr1 for position control and the blue light beams Lb1 and Lb2 for information recording, i.e., at the target mark position which is on the rear side of the target track in the reflective transmissive film 104 and which gives the target depth.

In addition, the optical disc 100 is so designed that when prerecorded information is read out, the readout blue light beam Lb3 is emitted from the recording mark RM recorded at the position of the focus Fb1, i.e., the target mark position, because of the use of the red light beam Lr1 for position control and the blue light beam Lb1 for information reading.

(1-2) Structure of Optical Disc Drive

Figure 6:
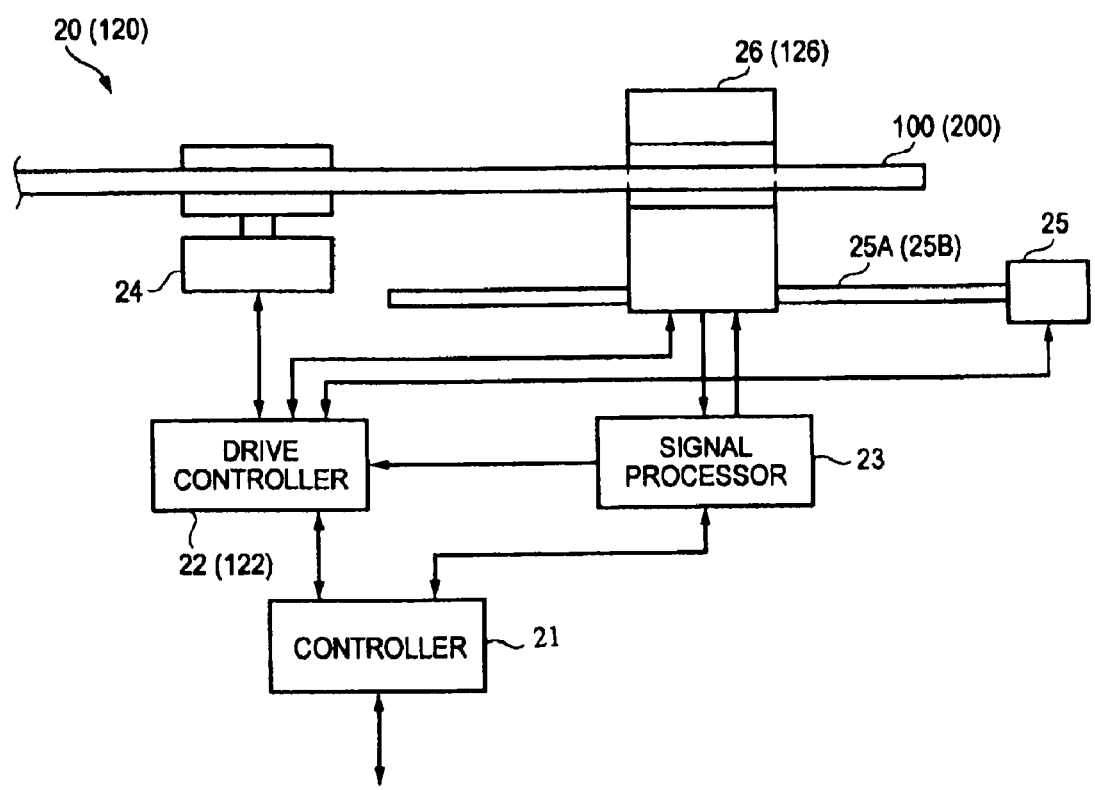
FIG. 6 is a schematic block diagram of an optical disc drive according to one embodiment of the invention.

An optical disc drive 20 corresponding to the aforementioned optical disc 100 is next described. As shown in FIG. 6, the optical disc drive 20 has a controller 21 that controls the whole portion of the drive.

The controller 21 has a CPU (central processing unit) (not shown) at its main component. The controller reads various kinds of programs such as an OS (operating system) and an information-recording program from a ROM (read only memory) (not shown) and expands the OS and program into a RAM (random access memory) (not shown), thus executing various kinds of processing such as recording of information.

For example, when the optical disc 100 is loaded, and when an instruction for recording information, information about reading, and recording address information are accepted from an external device (not shown), the controller 21 supplies a driving instruction and recording address information to a drive controller 22 and supplies the information about the reading to a signal processor 23. The recording address information is information indicating addresses at which the recording information should be recorded, out of the addresses assigned to the recording layer 101 of the optical disc 100.

The drive controller 22 has a CPU (not shown) at its main component in the same way as the controller 21. The drive controller 22 reads various kinds of programs such as a tracking control program from a ROM (not shown) and expands the programs into a RAM (not shown), thus executing various kinds of processing such as tracking control.

The drive controller 22 controllably drives a spindle motor 24 according to the driving instruction and rotates the optical disc 100 at a given rotational speed. The drive controller 22 also controllably drives a thread motor 25 to move the optical pickup 26 along moving shafts 25A and 25B and radially of the disc 100 (i.e., inwardly or outwardly) into a position indicated by the recording address information.

The signal processor 23 processes the supplied recording information in various manners such as given encoding or modulation to create a recording signal which is supplied to the optical pickup 26.

Figure 7:
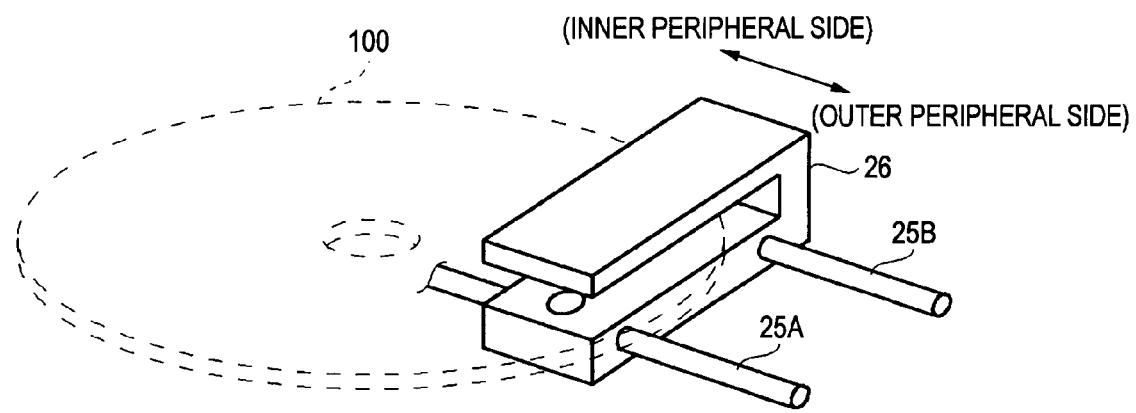
FIG. 7 is a schematic perspective view of an optical pickup, showing its outer appearance.

As shown in FIG. 7, the optical pickup 26 has a substantially U-shaped side surface. The pickup can focus the optical beam from both sides as shown in FIG. 5B and direct the beam at the optical disc 100.

Under control of the drive controller 22 (FIG. 6), the optical pickup 26 provides focus control and tracking control, thus aligning the beam irradiation position to the track (hereinafter referred to as the target track) indicated by the recording address information in the recording layer 101 of the optical disc 100. The recording mark RM corresponding to the recording signal from the signal processor 23 is recorded in a manner described in detail later.

When an information reading instruction and reading address information indicating the addresses for the recording information are received, for example, from an external device (not shown), the controller 21 supplies a driving instruction to the drive controller 22 and supplies a reading instruction to the signal processor 23.

The drive controller 22 controllably drives the spindle motor 24 to rotate the optical disc 100 at a given rotational speed in the same way as when information is recorded. The drive controller 22 also controllably drives the thread motor 25 to move the optical pickup 26 into a position indicated by the reading address information.

The optical pickup 26 provides focus control and tracking control under control of the drive controller 22 (FIG. 6) to align the beam irradiation position to the track (i.e., the target track) indicated by the reading address information in the recording layer 101 of the optical disc 100. A light beam having a given amount of light is emitted. At this time, the pickup 26 detects the readout light beam generated from the recording mark RM in the recording layer 101 in the disc 100 and supplies a detection signal corresponding to the light amount to the signal processor 23 in a manner described in detail later.

The signal processor 23 processes the supplied detection signal in various manners such as given demodulation or decoding to thereby create readout information that is supplied to the controller 21. Correspondingly, the controller 21 sends the readout information to an external device (not shown).

In this way, in the optical disc drive 20, the optical pickup 26 is controlled by the controller 21 to record information onto the target track in the recording layer 101 of the optical disc 100 or to read information from the target track.

(1-3) Structure of Optical Pickup

Figure 8:
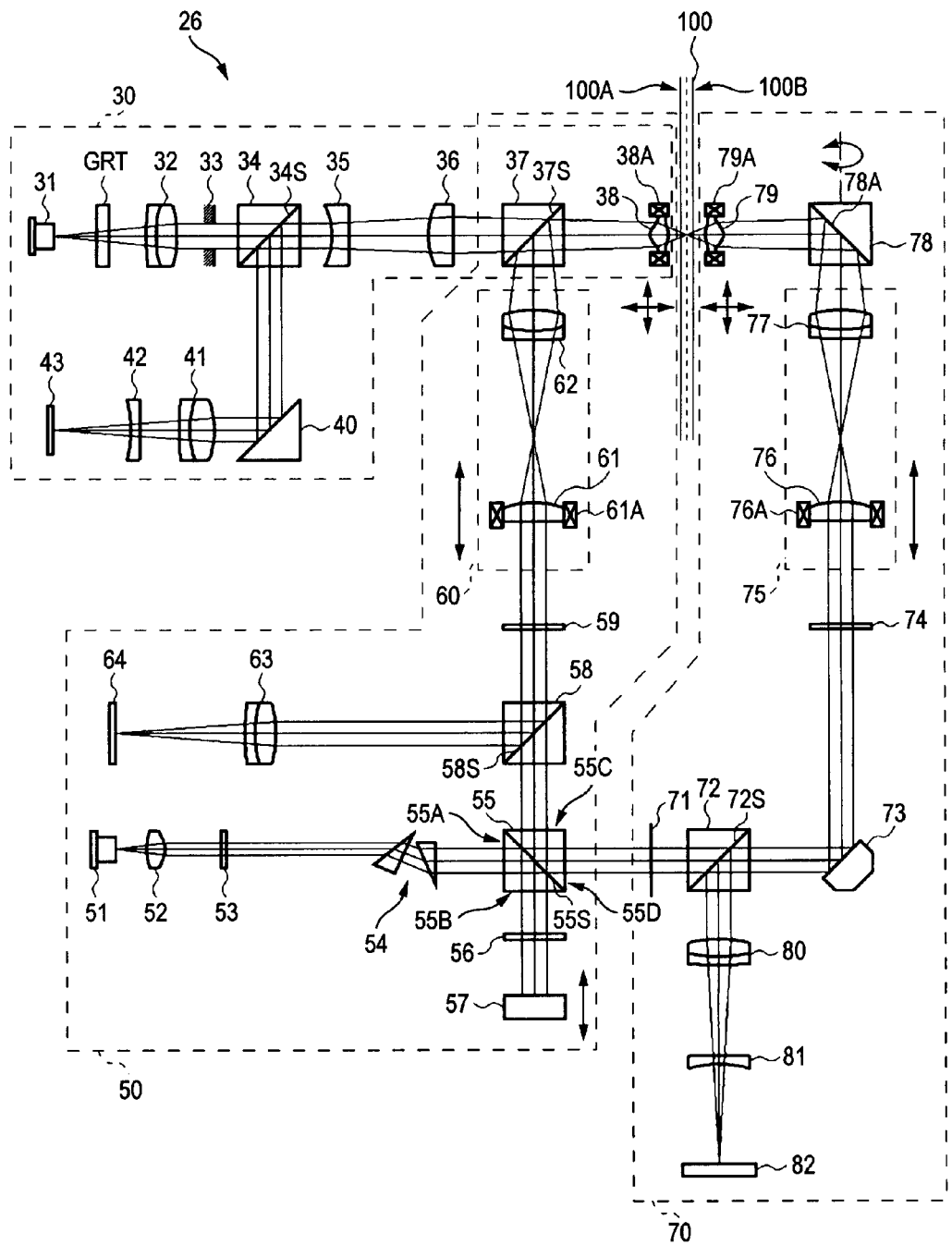
FIG. 8 is a schematic ray diagram showing the structure of the optical pickup shown in FIG. 7.

The structure of the optical pickup 26 is next described. As schematically shown in FIG. 8, the optical pickup 26 is made up of a number of optical components and roughly partitioned into a guide surface position-controlling optical subsystem 30, a guide surface information optical subsystem 50, and a recording light-illuminated surface optical subsystem 70.

(1-3-1) Structure of Guide Surface Red Beam Optical Subsystem

The guide surface position-controlling optical subsystem 30 emits the red light beam Lr1 to the guide surface 100A of the optical disc 100 and receives the reflected red light beam Lr2 that is reflection of the red light beam Lr1 from the optical disc 100.

Figure 9:
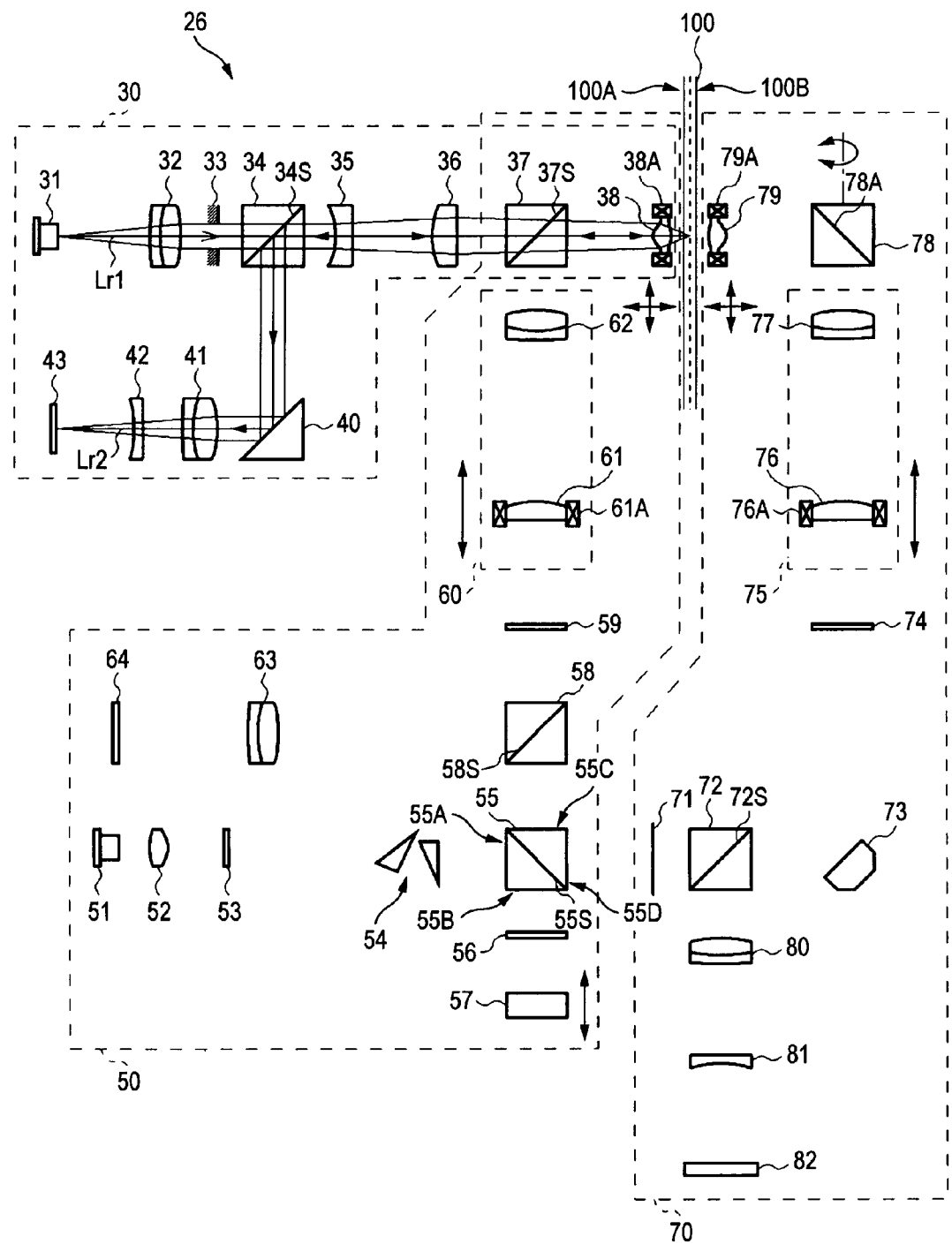
FIG. 9 is a schematic ray diagram showing the optical path for a red light beam.

In FIG. 9, the guide surface position-controlling optical subsystem 30 has a laser diode 31 capable of emitting red laser light having a wavelength of about 660 nm. In practice, the laser diode 31 emits the red light beam Lr1 of a given amount of light under control of the controller 21 (FIG. 6). The red beam Lr1 is made of divergent light. The emitted red beam is split into three light beams including one main beam and two subbeams by a grating GRT and then passed into a collimator lens 32.

The red light beam Lr1 is split by the grating GRT. At this time, the amount of light of the main beam is relatively large. The amounts of light of the two subbeams are substantially equal. For convenience of illustration, the subbeams are omitted in the figure, and only the main beam is shown.

The collimator lens 32 converts the red light beam Lr1 from divergent light into collimated light and causes the red beam to enter a non-polarizing beam splitter 34 via a slit 33. The splitter 34 has a reflective transmissive surface 34A that transmits about 50% of the red light beam Lr1. The beam is then passed into a correcting lens 35. Correcting lenses 35 and 36 once diverge the red light beam Lr1 and converge it. Then, the beam is passed into a dichroic prism 37.

The reflective transmissive surface 37S of the dichroic prism 37 has wavelength selectivity. That is, the transmissivity and reflectivity are varied by the wavelength of the incident optical beam. The reflective transmissive surface 37S transmits about 100% of incident red light beam and reflects about 100% of incident blue light beam. Therefore, the reflective transmissive surface 37S of the dichroic prism 37 transmits the red light beam Lr1 and passes the red beam into the objective lens 38.

Figure 10:
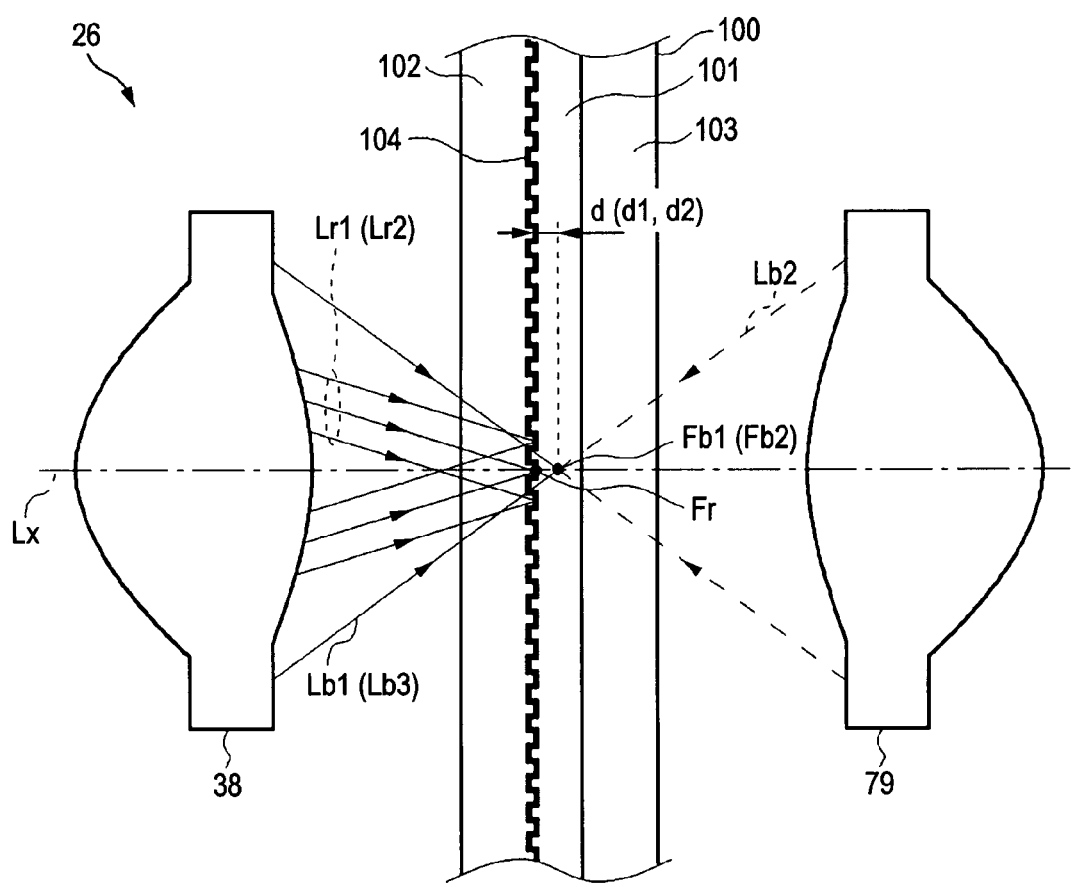
FIG. 10 is a schematic representation showing the manner in which an optical disc is illuminated with light beams.

The objective lens 38 condenses the red light beam Lr1 and directs it toward the guide surface 100A of the optical disc 100. The red light beam Lr1 including three light beams (subbeams) is transmitted through the substrate 102, is reflected by the reflective transmissive film 104, and forms the reflected red light beam Lr2 going in the reverse direction to the red light beam Lr1 as shown in FIG. 10 corresponding to FIG. 5B.

The objective lens 38 is designed optimally for the blue light beam Lb1. With respect to the red light beam Lr1, the objective lens 38 acts as a condenser lens having a numerical aperture NA of 0.41 because of the optical distances to the slit 33 and correcting lenses 35, 36 and other relationships.

Then, the reflected red beam Lr2 (FIG. 9) is transmitted through the objective lens 38, dichroic prism 37, and correcting lenses 36, 35 in turn and converted into collimated light. The light is then passed into the non-polarizing beam splitter 34.

The non-polarizing beam splitter 34 reflects about 50% of the reflected red light beam Lr2 to a mirror 40. The mirror 40 again reflects the red light beam Lr2 into a condenser lens 41.

The condenser lens 41 converges the reflected red light beam Lr2 and imparts astigmatism to the beam by a cylindrical lens 42. The reflected red light beam Lr2 is made to hit a photodetector 43.

In the optical disc drive 20, there is the possibility that the optical disc 100 wobbles when it is rotating. Therefore, there is the possibility that the position of the target track relative to the guide surface position-controlling optical subsystem 30 varies.

In order that the focus Fr (FIG. 10) of the red light beam Lr1 in the guide surface position-controlling optical subsystem 30 follow the target track, it may be necessary to move the focus Fr in the focusing direction (i.e., toward or away from the optical disc 100) and in the tracking direction (i.e., inwardly or outwardly of the disc 100).

Accordingly, the objective lens 38 can be driven in the directions of two axes, i.e., in the focusing direction and tracking direction, by a two-axis actuator 38A.

In the guide surface position-controlling optical subsystem 30 (FIG. 9), the optical positions of the various optical components are so adjusted that the state in which the drive is in focus when the red light beam Lr1 is condensed by the objective lens 38 and directed at the reflective transmissive film 104 of the optical disc 100 is reflected in the state in which the drive is in focus when the reflected red light beam Lr2 is condensed by the condenser lens 41 and directed at a photodetector 43.

Figure 11:
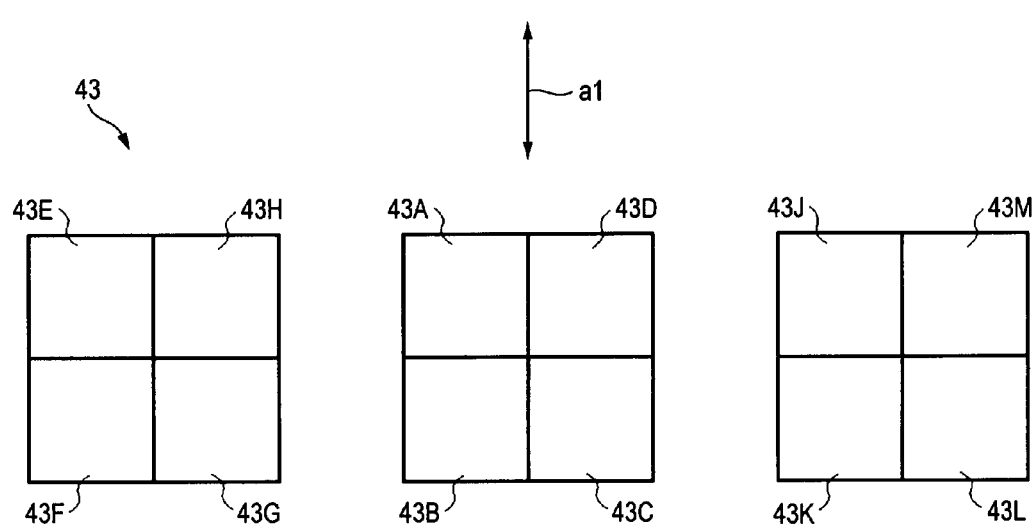
FIG. 11 schematically represents the structure of detection regions of a photodetector.

As shown in FIG. 11, the surface of the photodetector 43 illuminated with the reflected red light beam Lr2 has four split detection regions 43A, 43B, 43C, and 43D which are arranged like a lattice. The direction indicated by the arrow a1 (in the vertical direction in the figure) corresponds to the direction of motion of the tracks when the red light beam Lr1 is made to hit the reflective transmissive film 104 (FIG. 10).

The photodetector 43 detects parts of the main beam of the reflected red light beam Lr2 by the detection regions 43A, 43B, 43C, and 43D, creates detection signals SDAr, SDBr, SDCr, and SDDr corresponding to the detected amounts of light, and sends the signals to the signal processor 23 (FIG. 6).

Similarly, the photodetector 43 detects parts of the subbeams of the reflected red light beam Lr2 by the detection regions 43E, 43F, 43G, 43H and detection regions 43J, 43K, 43L, and 43M, creates detection signals SDEr, SDFr, SDGr, SDHr and detection signals SDJr, SDKr, SDLr, and SDMr corresponding to the detected amounts of light, and sends the signals to the signal processor 23 (FIG. 6).

The signal processor 23 provides focus control by a so-called astigmatic method. The process or calculates a focus error signal SFEr according to the following Eq. (3) and supplies the signal to the drive controller 22.

$$SFEr=(SDAr+SDCr)-(SDBr+SDDr) \qquad (3)$$

The focus error signal SFEr indicates the amount of deviation between the focus Fr of the main beam of the red light beam Lr1 and the position of the reflective transmissive film 104 of the optical disc 100.

Similarly, the signal processor 23 calculates the focus error signals SFEra and SFErb owing to the subbeams according to the following Eqs. (4) and (5) and supplies the signals to the drive controller 22.

$$SFEra=(SDEr+SDGr)-(SDFr+SDHr) \qquad (4)$$

$$SFErb=(SDJr+SDLr)-(SDKr+SDMr) \qquad (5)$$

The focus error signals SFEra and SFErb are used when a radial (from inside to outside and vice versa) tilt of the optical disc 100 is detected in a manner described in detail later.

The signal processor 23 provides tracking control by a so-called push-pull method. The processor calculates a tracking error signal STEr according to the following Eq. (4) and supplies the signal to the drive controller 22.

$$STEr=(SDAr+SDDr)-(SDBr+SDCr) \qquad (6)$$

This tracking error signal STEr indicates the amount of deviation between the focus Fr of the main beam of the red light beam Lr1 and the position of the target track in the reflective transmissive film 104 of the optical disc 100.

The drive controller 22 creates a focus drive signal SFDr based on the focus error signal SFEr and supplies the drive signal SFDr to the two-axis actuator 38A to provide feedback control (i.e., focus control) of the objective lens 38 such that the main beam of the red light beam Lr1 is aligned to the reflective transmissive film 104 of the optical disc 100.

The drive controller 22 also creates the tracking drive signal STDr based on the tracking error signal STEr and supplies the drive signal STDr to the two-axis actuator 38A to provide feedback control (i.e., tracking control) of the objective lens 38 such that the main beam of the red light beam Lr1 is focused onto the target track of the reflective transmissive film 104 of the optical disc 100.

In this way, the guide surface position-controlling optical subsystem 30 is designed to direct the red light beam Lr1 to the reflective transmissive film 104 of the optical disc 100 and to supply the results of reception of the reflected light, i.e., the red light beam Lr2, to the signal processor 23. Correspondingly, the drive controller 22 provides focus control and tracking control of the objective lens 38 such that the main beam of the red light beam Lr1 is focused onto the target track of the reflective transmissive film 104.

(1-3-2) Configuration of Guide Surface Blue Beam Optical Subsystem

The guide surface information optical subsystem 50 is designed to direct the blue light beam Lb1 to the guide surface 100A of the optical disc 100 and to receive the blue light beam Lb2 entered from the disc 100 or readout blue light beam Lb3.

(1-3-2-1) Blue Light Beam Illumination

Figure 12:
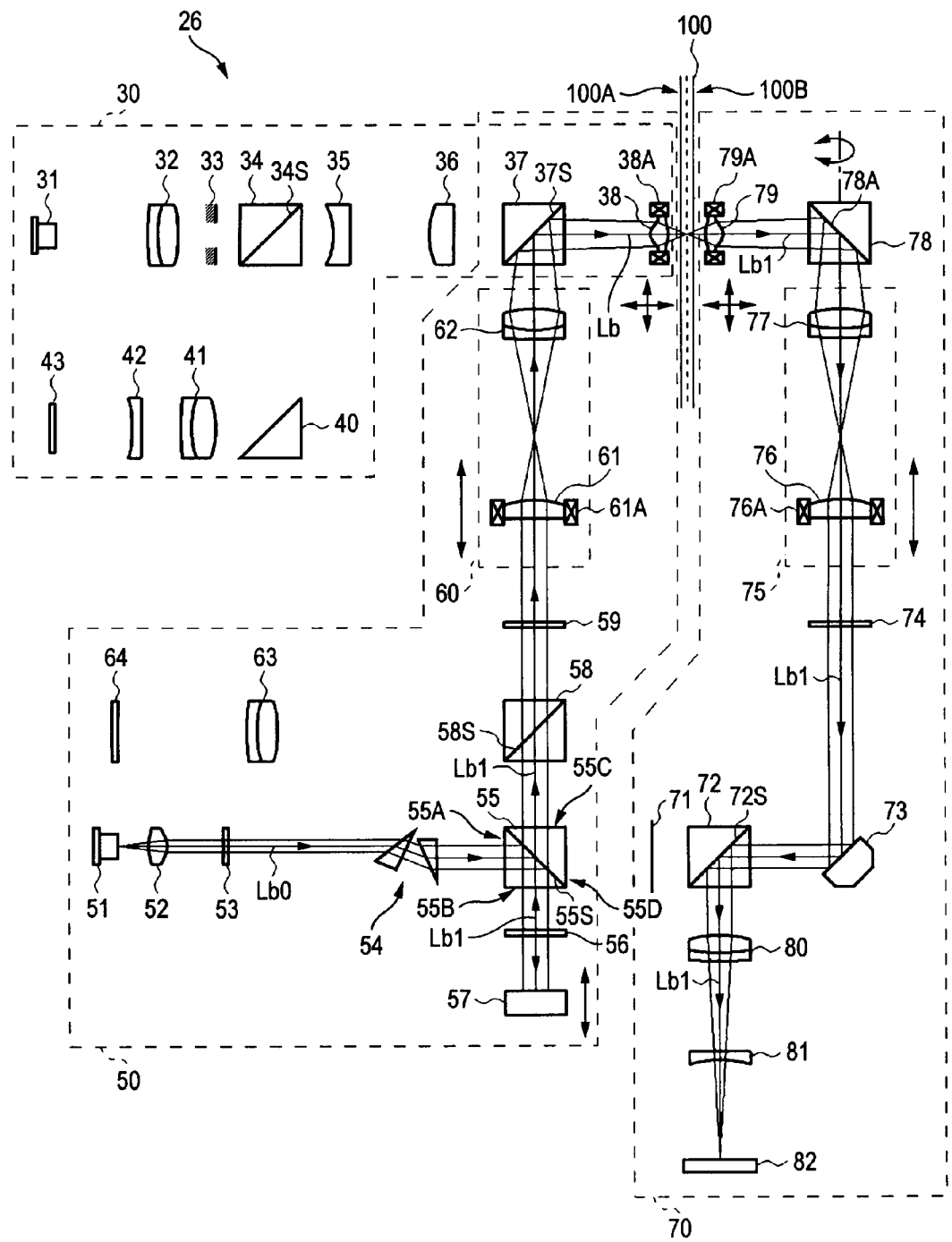
FIG. 12 is a schematic representation of optical path (1) for a blue light beam.

In FIG. 12, the laser diode 51 of the guide surface information optical subsystem 50 can emit blue light laser light having a wavelength of about 405 nm. In practice, the laser diode 51 emits the blue light beam Lb0 being divergent light under control of the controller 21 (FIG. 6). The beam is entered into a collimator lens 52. The collimator lens 52 converts the blue light beam Lb0 from divergent light into collimated light and passes the beam into a ½ wave plate 53.

At this time, the direction of polarization of the blue light beam Lb0 is rotated through a given angle by the ½ wave plate 53 and the intensity distribution is shaped by an anamorphic prism 54. Then, the beam is made to hit the surface 55A of the polarizing beam splitter 55.

The reflective transmissive surface 55S of the polarizing beam splitter 55 reflects or transmits a different ratio of a light beam according to a different direction of polarization of the beam. For example, the reflective transmissive surface 55S reflects about 50% of a p-polarized light beam and transmits the remaining 50%. The surface 55S transmits about 100% of an s-polarized light beam.

In practice, the reflective transmissive surface 55S of the polarizing beam splitter 55 reflects about 50% of the p-polarized blue light beam Lb0. The reflected beam is passed into a ¼ wave plate 56 from the surface 55B. The remaining 50% is transmitted and passed into a shutter 71 from the surface 55D. In the following description, the blue light beam reflected by the reflective transmissive surface 55S is referred to as the blue light beam Lb1, while the blue light beam transmitted through the reflective transmissive surface 55S is referred to as the blue light beam Lb2.

The ¼ wave plate 56 converts the blue light beam Lb1 from linear polarization to circular polarization and directs the beam to a movable mirror 57. The blue light beam Lb1 reflected by the movable mirror 57 is converted from circular polarization to linear polarization and again passed to the surface 55B of the polarizing beam splitter 55.

At this time, the blue light beam Lb1 is converted, for example, by the ¼ wave plate 56 from p-polarization to left-handed circular polarization. When the beam is reflected by the movable mirror 57, the beam is converted from left-handed circular polarization to right-handed circular polarization and then converted again from right-handed circular polarization to s-polarization by the ¼ wave plate 56. That is, the direction of polarization of the blue light beam Lb1 is different between when the beam emerges from the surface 55B and when the beam enters the surface 55B after being reflected by the movable mirror 57.

The reflective transmissive surface 55S of the polarizing beam splitter 55 transmits the blue light beam Lb1 intact according to the direction of polarization (s-polarization) of the blue light beam Lb1 entered from the surface 55B. The beam is then passed into the polarizing beam splitter 58 from the surface 55C.

As a result, the guide surface information optical subsystem 50 prolongs the optical path length of the blue light beam Lb1 by the polarizing beam splitter 55, ¼ wave plate 56, and movable mirror 57.

The reflective transmissive surface 55S of the polarizing beam splitter 58 is designed, for example, to reflect about 100% of a p-polarized light beam and to transmit about 100% of an s-polarized light beam. In practice, the reflective transmissive surface 58S of the splitter 58 transmits the blue light beam Lb1 intact. The beam is then converted by the ¼ wave plate 59 from linear polarization (s-polarization) to circular polarization (right-handed circular polarization) and passed into a relay lens 60.

The relay lens 60 converts the blue light beam Lb1 from collimated light to converged light by the movable lens 61. The blue beam Lb1 becomes divergent light after convergence. The blue beam Lb1 is again converted to converged light by a fixed lens 62 and passed into the dichroic prism 37.

The movable lens 61 is moved by an actuator 61A in the direction of the optical axis of the blue light beam Lb1. In practice, the relay lens 60 moves the movable lens 61 by the actuator 61A under control of the controller 21 (FIG. 6), thus capable of varying the state of convergence of the blue light beam Lb1 emerging from the fixed lens 62.

The dichroic prism 37 reflects the blue light beam Lb1 by the reflective transmissive surface 37S according to the wavelength of the blue beam Lb1 and passes the beam into the objective lens 38. When the blue light beam Lb1 is reflected by the reflective transmissive surface 37S, the direction of polarization in circular polarization is inverted, e.g., from right-handed circular polarization to left-handed circular polarization.

The objective lens 38 condenses the blue light beam Lb1 and passes it to the guide surface 100A of the optical disc 100. With respect to the blue light beam Lb1, the objective lens 38 acts as a condenser lens having a numerical aperture (NA) of 0.5 because of the optical distance to the relay lens 60 and other relationships.

At this time, as shown in FIG. 10, the blue light beam Lb1 is transmitted through the substrate 102 and reflective transmissive film 104 and brought to a focus within the recording layer 101. The position of the focus Fb1 of the blue light beam Lb1 is determined by the state of convergence assumed when the beam exits from the fixed lens 62 of the relay lens 60. That is, the focus Fb1 is moved toward the guide surface 100A or toward the recording light-illuminated surface 100B within the recording layer 101 according to the position of the movable lens 61.

In particular, the guide surface information optical subsystem 50 is so designed that a substantially proportional relationship holds between the distance moved by the movable lens 61 and the distance moved by the focus Fb1 of the blue light beam Lb1. For example, if the movable lens 61 is moved a distance of 1 mm, the focus Fb1 of the blue light beam Lb1 moves 30 µm.

In practice, in the guide surface information optical subsystem 50, the position of the movable lens 61 is controlled by the controller 21 (FIG. 6), whereby the depth d1 (i.e., the distance from the reflective transmissive film 104) of the focus Fb1 (FIG. 10) of the blue light beam Lb1 within the recording layer 101 of the optical disc 100 is adjusted.

After being converged to the focus Fb1, the blue light beam Lb1 becomes divergent light and is transmitted through the recording layer 101 and substrate 103. The beam exits from the recording light-illuminated surface 100B and is passed into the objective lens 79 in a manner described in detail later.

In this way, the guide surface information optical subsystem 50 emits the blue light beam Lb1 from the guide surface 100A of the optical disc 100. The focus Fb1 of the blue light beam Lb1 is placed within the recording layer 101. The depth d1 of the focus Fb1 is adjusted according to the position of the movable lens 61 in the relay lens 60.

(1-3-2-2) Reception of Blue Light Beam

The optical disc 100 transmits the blue light beam Lb2 that is directed from the objective lens 79 of the recording light-illuminated surface optical subsystem 70 to the recording light-illuminated surface 100B. The beam is made to exit as divergent light from the guide surface 101A in a manner described in detail later. The blue light beam Lb2 is circularly polarized, e.g., right-handed circularly polarized.

Figure 13:
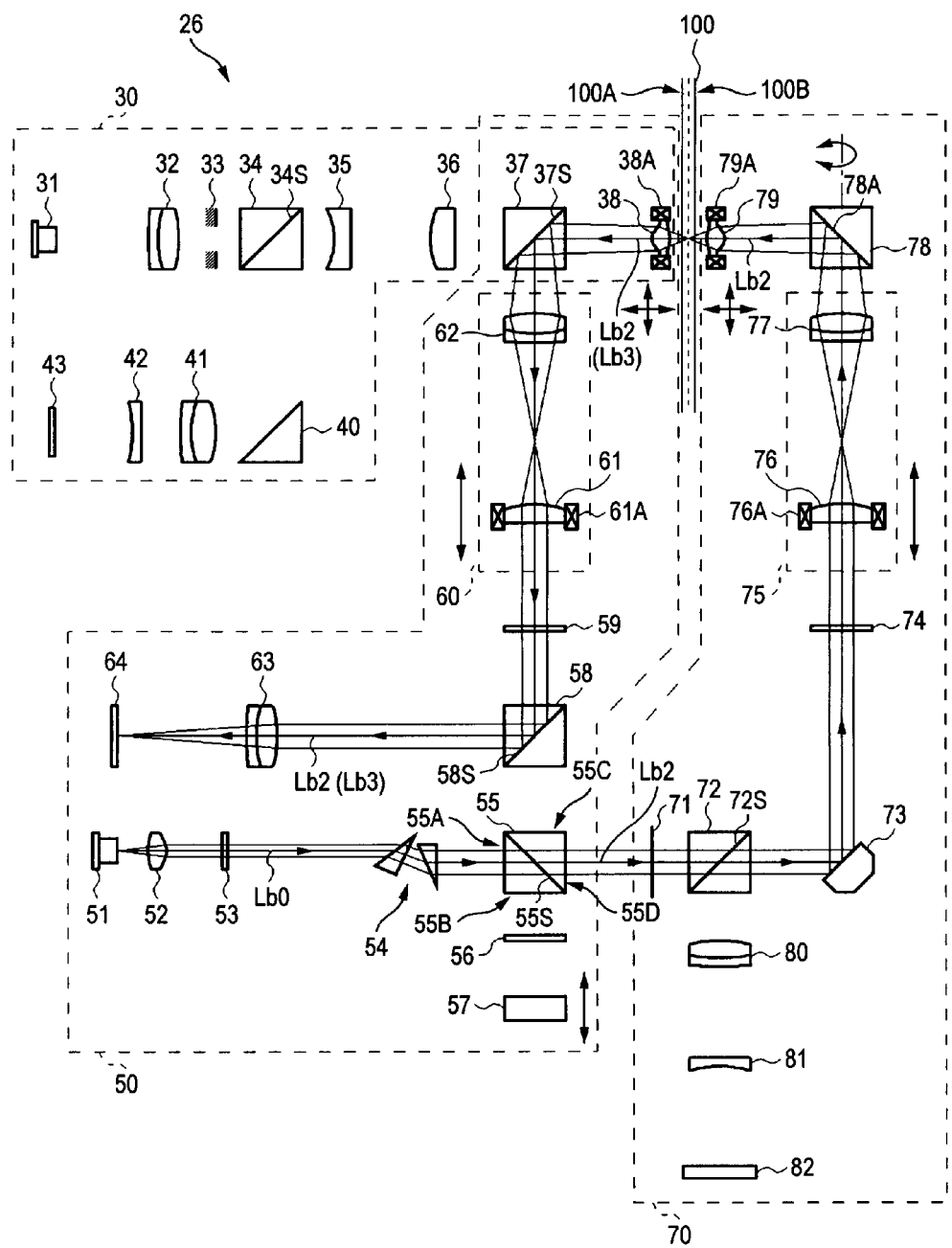
FIG. 13 is a schematic representation of optical path (2) for the blue light beam.

At this time, in the guide surface information optical subsystem 50, as shown in FIG. 13, the blue light beam Lb2 is somewhat converged by the objective lens 38 and then reflected by the dichroic prism 37. The beam is then passed into the relay lens 60. When the blue light beam Lb2 is reflected by the reflective transmissive surface 37S, the direction of polarization of the circular polarization is inverted. For example, the direction of polarization is converted from right-handed circular polarization to left-handed circular polarization.

Subsequently, the blue light beam Lb2 is converted into collimated light by the fixed lens 62 and movable lens 61 of the relay lens 60. The beam is then converted from circular polarization (left-handed circular polarization) to linear polarization (p-polarization) by the ¼ wave plate 59 and then passed into the polarizing beam splitter 58.

The polarizing beam splitter 58 reflects the blue light beam Lb2 according to the direction of polarization of the blue light beam Lb2 and passes the beam into the condenser lens 63. The condenser lens 63 condenses the blue light beam Lb2 and passes it into a photodetector 64.

The optical components within the guide surface information optical subsystem 50 are so arranged that the blue light beam Lb2 is brought to a focus on the photodetector 64.

The photodetector 64 detects the amount of light of the blue light beam Lb2, creates a readout detection signal SDp according to the detected amount of light, and supplies the signal to the signal processor 23 (FIG. 6).

The readout detection signal SDp created at this time according to the amount of light of the blue light beam Lb2 in the photodetector 64 has no applications. Therefore, the signal processor 23 is made to perform no signal processing, though the readout detection signal SDp is supplied to the processor 23.

On the other hand, where a recording mark RM is recorded in the recording layer 101 of the optical disc 100, when the focus Fb1 of the blue light beam Lb1 is brought to a focus onto the recording mark RM as mentioned previously, the readout blue light beam Lb3 is generated from the recording mark RM because of the nature of the hologram.

Because of the principle of the hologram, when the recording mark RM is recorded, the readout blue light beam Lb3 reproduces a light beam emitted other than the blue light beam Lb1, i.e., the blue light beam Lb2. Accordingly, the readout blue light beam Lb3 takes the same optical path as the blue light beam Lb2 in the guide surface information optical subsystem 50. Finally, the beam is passed into the photodetector 64.

The optical components within the guide surface information optical subsystem 50 are arranged such that the blue light beam Lb2 is focused onto the photodetector 64 as described previously. Therefore, the readout blue light beam Lb3 is focused onto the photodetector 64 in the same way as the blue light beam Lb2.

The photodetector 64 detects the amount of light of the blue light beam Lb3, creates a readout detection signal SDp according to the detected amount of light, and supplies the signal to the signal processor 23 (FIG. 6).

In this case, the readout detection signal SDp represents the information recorded on the optical disc 100. Therefore, the signal processor 23 creates readout information by processing the readout detection signal SDp in a given manner (e.g., demodulation or decoding) and supplies the readout information to the controller 21.

In this way, the guide surface information optical subsystem 50 receives the blue light beam Lb2 or the readout blue light beam Lb3 that is incident on the objective lens 38 from the guide surface 100A of the optical disc 100. The results of the reception are supplied to the signal processor 23.

(1-3-3) Configuration of Recording Light-Illuminated Surface
Optical Subsystem

The recording light-illuminated surface optical subsystem 70 (FIG. 8) is designed to emit the blue light beam Lb2 to the recording light-illuminated surface 100B of the optical disc 100 and to receive the blue light beam Lb1 transmitted through the optical disc 100 after the beam is emitted from the guide surface information optical subsystem 50.

(1-3-3-1) Blue Light Beam Illumination

Referring to FIG. 13, in the guide surface information optical subsystem 50, the reflective transmissive surface 55S of the polarizing beam splitter 55 transmits about 50% of the p-polarized blue light beam Lb0 and passes the transmitted beam as a blue light beam Lb2 into the shutter 71 from the surface 55D as described previously.

The shutter 71 blocks or transmits the blue light beam Lb2 under control of the controller 21 (FIG. 6). Where the shutter transmits the blue light beam Lb2, the beam is passed into the polarizing beam splitter 72.

For example, a mechanical shutter for blocking or transmitting the blue light beam Lb2 by mechanically moving a blocking plate that blocks the blue light beam Lb2 or a liquid crystal shutter for blocking or transmitting the blue light beam Lb2 by varying the voltage applied to a liquid crystal panel can be used as the shutter 71.

The polarizing beam splitter 72 is so designed that its reflective transmissive surface 72S transmits about 100% of, for example, a p-polarized light beam and reflects about 100% of an s-polarized light beam. In practice, the polarizing beam splitter 72 transmits the p-polarized blue light beam Lb2 intact, and it is reflected by the mirror 73. Then, the beam is converted from linear polarization (p-polarization) to circular polarization (left-handed circular polarization) by the ¼ wave plate 74 and passed into the relay lens 75.

The relay lens 75 is similar in structure to the relay lens 60, and has movable lens 76, actuator 76A, and fixed lens 77 corresponding to the movable lens 61, actuator 61A, and fixed lens 62, respectively.

The relay lens 75 converts the blue light beam Lb2 from collimated light to converged light by the movable lens 76. The blue light beam Lb2 which has become divergent light after the convergence is again converted to converged light by the fixed lens 77 and passed into a galvano mirror 78.

The relay lens 75 can move the movable lens 76 by the actuator 76A under control of the controller 21 (FIG. 6) to vary the state of convergence of the blue light beam Lb2 exiting from the fixed lens 77 in the same way as the relay lens 60.

The galvano mirror 78 reflects the blue light beam Lb2 and passes it into the objective lens 79. When reflected, the blue light beam Lb2 is inverted in direction of circular polarization. For example, the beam is converted from left-handed circular polarization to right-handed circular polarization.

The galvano mirror 78 can vary the angle of the reflective surface 78A and adjust the direction of motion of the blue light beam Lb2 by adjusting the angle of the reflective surface 78A under control of the controller 21 (FIG. 6).

The objective lens 79 is formed integrally with the two-axis actuator 79A. The objective lens can be driven by the two-axis actuator 79A in the two-axis directions, that is, in the focusing direction (i.e., toward or away from the optical disc 100) and in the tracking direction (i.e., inwardly or outwardly of the disc 100) in the same way as the objective lens 38.

The objective lens 79 condenses the blue light beam Lb2 and directs it to the recording light-illuminated surface 100B of the optical disc 100. The objective lens 79 is similar in optical characteristics to the objective lens 38. The objective lens 79 acts as a condenser lens having a numerical aperture (NA) of 0.5 because of the optical distance to the relay lens 75 or other relationships for the blue light beam Lb2.

At this time, the blue light beam Lb2 is transmitted through the substrate 103 and brought to a focus within the recording layer 101 as shown in FIG. 10. The position of the focus Fb2 of the blue light beam Lb2 is determined by the state of convergence assumed when the beam exits from the fixed lens 77 of the relay lens 75. That is, the focus Fb2 is moved toward the guide surface 100A or toward the recording light-illuminated surface 100B within the recording layer 101 according to the position of the movable lens 76, in the same way as the focus Fb1 of the blue light beam Lb1.

In particular, the recording light-illuminated surface optical subsystem 70 is so designed that a substantially proportional relationship holds between the distance moved by the movable lens 76 and the distance moved by the focus Fb2 of the blue light beam Lb2 in the same way as the guide surface information optical subsystem 50. For example, if the movable lens 76 is moved a distance of 1 mm, the focus Fb2 of the blue light beam Lb2 moves 30 μm.

In practice, in the recording light-illuminated surface optical subsystem 70, the position of the movable lens 76 in the relay lens 75 is controlled by the controller 21 (FIG. 6), together with the position of the movable lens 61 in the relay lens 60, whereby the depth d2 of the focus Fb2 (FIG. 10) of the blue light beam Lb2 within the recording layer 101 of the optical disc 100 is adjusted.

At this time, in the optical disc drive 20, the focus Fb2 of the blue light beam Lb2 assumed when the objective lens 79 is in its reference position is aligned with the focus Fb1 of the blue light beam Lb1 assumed when the objective lens 38 is in its reference position within the recording layer 101 when the controller 21 (FIG. 6) assumes that the optical disc 100 has not wobbled (i.e., under an ideal state).

After brought to a focus at the focus Fb2, the blue light beam Lb2 is transmitted through the recording layer 101, reflective transmissive layer 104, and substrate 102 while diverging. Then, the beam exits from the guide surface 100A and is passed into the objective lens 38.

The recording light-illuminated surface optical subsystem 70 is so designed that the blue light beam Lb2 is emitted from the recording light-illuminated surface 100B of the optical disc 100 to bring the focus Fb2 of the blue light beam Lb2 into the recording layer 101 and to adjust the depth d2 of the focus Fb2 according to the position of the movable lens 76 in the relay lens 75.

(1-3-3-2) Reception of Blue Light Beam

The blue light beam Lb1 emitted from the objective lens 38 of the guide surface information optical subsystem 50 (FIG. 12) is once converged within the recording layer 101 of the optical disc 100 and then becomes divergent light as described above. The light is then passed into the objective lens 79.

At this time, in the recording light-illuminated surface optical subsystem 70, the blue light beam Lb1 is somewhat converged by the objective lens 79 and then reflected by the galvano mirror 78. The beam is then passed into the relay lens 75. When reflected at the reflective surface 78A, the blue light beam Lb1 is inverted in direction of circular polarization, e.g., converted from left-handed circular polarization to right-handed circular polarization.

Subsequently, the blue light beam Lb1 is converted into collimated light by the fixed lens 77 and movable lens 76 in the relay lens 75 and converted from circular polarization (right-handed circular polarization) to linear polarization (s-polarization) by the ¼ wave plate 74. Then, the beam is reflected by the mirror 73 and passed into the polarizing beam splitter 72.

The polarizing beam splitter 72 reflects the blue light beam Lb1 according to the direction of polarization of the blue light beam Lb1 into a condenser lens 80. The condenser lens 80 converges the blue light beam Lb1, and astigmatism is imparted to the beam by a cylindrical lens 81. The blue light beam Lb1 is directed at a photodetector 82.

In practice, however, there is the possibility that the optical disc 100 wobbles. Therefore, the guide surface position-controlling optical subsystem 30 and the drive controller 22 (FIG. 6) provide focus control and tracking control of the objective lens 38 as described previously.

At this time, concomitantly with movement of the objective lens 38, the focus Fb1 of the blue light beam Lb1 is moved. Therefore, a deviation occurs from the position of the focus Fb2 of the blue light beam Lb2 assumed when the objective lens 79 is in its reference position.

Accordingly, in the recording light-illuminated surface optical subsystem 70, the optical positions of various optical components are adjusted such that the amount of deviation of the focus Fb2 of the blue light beam Lb2 from the focus Fb1 of the blue light beam Lb1 within the recording layer 101 is reflected in the state in which the blue light beam Lb1 is collected by the condenser lens 80 and directed at the photodetector 82.

Figure 14:
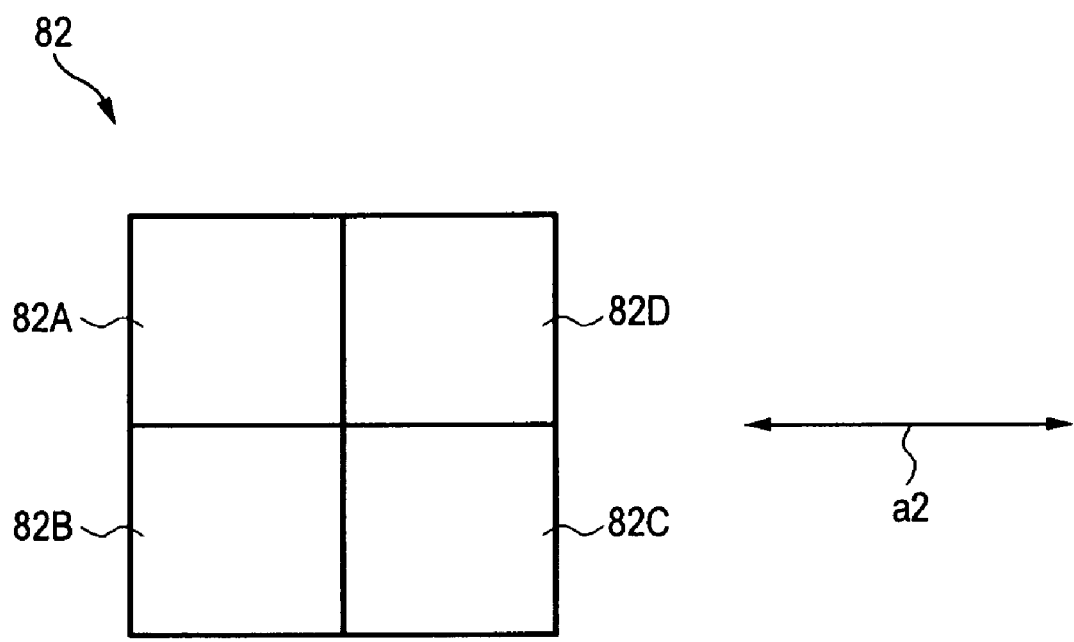
FIG. 14 is a schematic representation showing the structure of detection regions of a photodetector.

As shown in FIG. 14, the photodetector 82 has four split detection regions 82A, 82B, 82C, and 82D arranged like a lattice in the plane illuminated with the blue light beam Lb1 in the same way as the photodetector 43. The direction (lateral direction in the figure) indicated by the arrow a2 corresponds to the direction of motion of track in the reflective transmissive film 104 (FIG. 10) when the blue light beam Lb1 is emitted.

The photodetector 82 detects parts of the blue light beam Lb1 by the detection regions 82A, 82B, 82c, and 82D, creates detection signals SDAb, SDBb, SDCb, and SDDb according to the detected amounts of light, and sends the signals to the signal processor 23 (FIG. 6).

The signal processor 23 provides focus control by a so-called astigmatic method. The processor calculates the focus error signal SFEb according to the following Eq. (7) and supplies the signal to the drive controller 22.

$$SFEb=(SDAb+SDCb)-(SDBb+SDDb) \quad (7)$$

The focus error signal SFEb indicates the amount of deviation in the focusing direction between the focus Fb1 of the blue light beam Lb1 and the focus Fb2 of the blue light beam Lb2.

The signal processor 23 provides tracking control using a push-pull signal, calculates the tracking error signal STEb according to the following Eq. (8), and supplies the signal to the drive controller 22.

$$STEb=(SDAb+SDBb)-(SDCb+SDDb) \quad (8)$$

The tracking error signal STEb indicates the amount of deviation in the tracking direction between the focus Fb1 of the blue light beam Lb1 and the focus Fb2 of the blue light beam Lb2.

Furthermore, the signal processor 23 is designed to create a tangential error signal necessary for tangential control. The tangential control is provided to move the focus Fb2 of the blue light beam Lb2 into the target position in the tangential direction (i.e., the direction tangent to the track).

Specifically, the signal processor 23 provides tangential control using a push-pull signal, calculates a tangential error signal SNEb according to the following Eq. (9), and supplies the signal to the drive controller 22.

$$SNEb=(SDAb+SDDb)-(SDBb+SDCb) \quad (9)$$

The tangential error signal SNEb indicates the amount of deviation in the tangential direction between the focus Fb1 of the blue light beam Lb1 and the focus Fb2 of the blue light beam Lb2.

Correspondingly, the drive controller 22 creates a focus drive signal SFDb based on the focus error signal SFEb and supplies the drive signal SFDb to the two-axis actuator 79A to thereby provide focus control of the objective lens 79, reducing the amount of deviation of the focus Fb2 of the blue light beam Lb2 from the focus Fb1 of the blue light beam Lb1 in the focusing direction.

Furthermore, the drive controller 22 creates a tracking drive signal STDb based on the tracking error signal STEb and supplies the drive signal STDb to the two-axis actuator 79A to thereby provide tracking control of the objective lens 79, reducing the amount of deviation of the focus Fb2 of the blue light beam Lb2 from the focus Fb1 of the blue light beam Lb1 in the tracking direction.

Additionally, the drive controller 22 creates a tangential drive signal SNDb based on the tangential error signal SNEb and supplies the drive signal SNDb to the galvano mirror 78 to thereby provide tangential control for adjusting the angle of the reflective surface 78A in the galvano mirror 78 so as to reduce the amount of deviation of the focus Fb2 of the blue light beam Lb2 from the focus Fb1 of the blue light beam Lb1 in the tangential direction.

In this way, the recording light-illuminated surface optical subsystem 70 is so designed that it receives the blue light beam Lb1 which is entered into the objective lens 79 from the recording light-illuminated surface 100B of the optical disc 100 and then the optical subsystem 70 supplies the results of reception to the signal processor 23. Correspondingly, the driver controller 22 provides focus control and tracking control of the objective lens 79 and provides tangential control using the galvano mirror 78 such that the focus Fb2 of the blue light beam Lb2 is aligned with the focus Fb1 of the blue light beam Lb1.

(1-3-4) Adjustment of Optical Path Length

When information is recorded, the optical pickup 26 of the optical disc drive 20 causes the polarizing beam splitter 55 (FIG. 12) to separate the blue light beams Lb1 and Lb2 from the blue light beam Lb0. The blue light beams Lb1 and Lb2 are made to interfere with each other within the recording layer 101 of the optical disc 100. Consequently, the recording mark RM is recorded in the target mark position within the recording layer 101.

The laser diode 51 emitting the blue light beam Lb0 may need to make the coherent length of the blue light beam Lb0 greater than the hologram size (i.e., the height RMh of the recording mark RM) in order that the recording mark RM be correctly recorded as a hologram in the recording layer 101 of the optical disc 100 in conformity with general hologram formation conditions.

In practice, in the laser diode 51, the coherent length substantially corresponds to the product of the length of a resonator (not shown) mounted in the laser diode 51 and the refractive index of the resonator similarly to a general laser diode. Therefore, it is considered that the coherent length is about 100 μm to 1 mm.

On the other hand, in the optical pickup 26, the blue light beam Lb1 passes through the optical path in the guide surface information optical subsystem 50 (FIG. 12) and is emitted from the guide surface 100A of the optical disc 100. The blue light beam Lb2 passes through the optical path in the recording light-illuminated surface optical subsystem 70 (FIG. 13) and is emitted from the recording light-illuminated surface 1000B of the optical disc 100. That is, in the optical pickup 26, the optical paths for the blue light beams Lb1 and Lb2 are different from each other and so their optical path lengths (i.e., the length of the optical path from the laser diode 51 to the target mark position) are different.

Furthermore, in the optical pickup 26, the depth (target depth) of the target mark position in the recording layer 101 of the optical disc 100 is modified by adjusting the positions of the movable lenses 61 and 76 in the relay lenses 60 and 75 as described previously. The modification of the depth of the target mark position eventually varies the optical path lengths for the blue light beams Lb1 and Lb2 in the optical pickup 26.

However, in order that an interference pattern be formed in the optical pickup 26, the difference between the optical path lengths for the blue light beams Lb1 and Lb2 would need to be less than the coherent length (i.e., about 100 μm to 1 mm) because of general hologram formation conditions.

Accordingly, the controller 21 (FIG. 6) adjusts the optical path length for the blue light beam Lb1 by controlling the position of the movable mirror 57. In this case, the controller 21 varies the optical path length for the blue light beam Lb1 by moving the movable mirror 57 according to the position of the movable lens 61 by making use of the relationship between the position of the movable lens 61 in the relay lens 60 and the depth of the target mark position.

As a result, in the optical pickup 26, the difference between the optical path lengths for the blue light beams Lb1 and Lb2 can be suppressed to less than the coherent length. A recording mark RM made of a good hologram can be recorded in the target mark position within the recording layer 101.

In this way, the controller 21 of the optical disc drive 20 controls the position of the movable mirror 57 to thereby suppress the difference between the optical path lengths for the blue light beams Lb1 and Lb2 within the optical pickup 26 to less than the coherent length. As a result, a good recording mark RM can be recorded in the target mark position within the recording layer 101 of the optical disc 100.

(1-4) Recording and Reading of Information (1-4-1) Recording of Information on Optical Disc Where information is recorded on the optical disc 100, when the controller 21 (FIG. 6) of the optical disc drive 20 receives an information recording instruction, information about recording, and recording address information from an external device (not shown) as described previously, the controller supplies a driving instruction and the recording address information to the drive controller 22 and supplies the recording information to the signal processor 23.

At this time, the drive controller 22 emits the red light beam Lr1 from the guide surface 100A of the optical disc 100 by the guide surface position-controlling optical subsystem 30 (FIG. 9) of the optical pickup 26, and provides focus control and tracking control (i.e., position control) of the objective lens 38 based on the results of the detection of the reflected red light beam Lr2 that is reflection of the beam Lr1. This causes the focus Fr of the red light beam Lr1 to follow the target track indicated by the recording address information.

The controller 21 causes the guide surface information optical subsystem 50 (FIG. 12) to emit the blue light beam Lb1 from the guide surface 100A of the optical disc 100. At this time, the focus Fb1 of the blue light beam Lb1 is condensed by the objective lens 38 whose position is controlled. Consequently, the focus Fb1 is located on the rear side of the target track.

Furthermore, the controller 21 adjusts the depth d1 of the focus Fb1 (FIG. 10) to the target depth by adjusting the position of the movable lens 61 in the relay lens 60. As a result, the focus Fb1 of the blue light beam Lb1 is aligned with the target mark position.

On the other hand, the controller 21 controls the shutter 71 of the recording light-illuminated surface optical subsystem 70 (FIG. 13) to transmit the blue light beam Lb2 and causes it to be emitted from the recording light-illuminated surface 100B of the optical disc 100.

Furthermore, the controller 21 adjusts the depth d2 of the blue light beam Lb2 (FIG. 10) by adjusting the position of the movable lens 76 in the relay lens 75 in conformity with the position of the movable lens 61 in the relay lens 60. Consequently, the depth d2 of the focus Fb2 of the blue light beam Lb2 is brought into coincidence with the depth d1 of the focus Fb1 of the blue light beam Lb1 taken where it is assumed that the optical disc 100 does not wobble.

In addition, the controller 21 causes the recording light-illuminated surface optical subsystem 70 to detect the blue light beam Lb1 via the objective lenses 38 and 79. Based on the results of detection, the controller 21 causes the drive controller 22 to provide focus control and tracking control (i.e., position control) of the objective lens 79 and provides tangential control of the galvano mirror 78.

As a result, the focus Fb2 of the blue light beam Lb2 is aligned to the position of the focus Fb1 of the blue light beam Lb1, i.e., the target mark position.

Moreover, the controller 21 adjusts the position of the movable mirror 57 according to the position of the movable lens 61 in the relay lens 60 to suppress the difference between the optical path lengths for the blue light beams Lb1 and Lb2 to less than the coherent length.

Thus, the controller 21 of the optical disc drive 20 can form a good recording mark RM in the target mark position within the recording layer 101 of the optical disc 100.

The signal processor 23 (FIG. 6) creates a recording signal indicating binary data, for example, about a value of 0 or 1, based on the recording information supplied from an external device (not shown). In response to this, the laser diode 51 emits the blue light beam Lb0, for example, when the recording signal indicates a value of 1 and does not emit the blue light beam Lb0 when the recording signal indicates a value of 0.

In consequence, the optical disc drive 20 forms the recording mark RM at the target mark position within the recording layer 101 of the optical disc 100 when the recording signal indicates a value of 1 and does not form the recording mark RM at the target mark position when the recording signal indicates a value of 0. Hence, the value 1 or 0 of the recording signal can be recorded in the target mark position according to the presence or absence of the recording mark RM. As a result, the recording information can be recorded in the recording layer 101 of the disc 100.

(1-4-2) Reading of Information from Optical Disc

Where information is read from the optical disc 100, the controller 21 (FIG. 6) of the optical disc drive 20 causes the guide surface position-controlling optical subsystem 30 (FIG. 9) of the optical pickup 26 to emit the red light beam Lr1 from the guide surface 100A of the disc 100. Based on the results of the detection of the red light beam Lr2 that is reflection of the red beam Lr1, the drive controller 22 provides focus control and tracking control (i.e., position control) of the objective lens 38.

The controller 21 causes the guide surface information optical subsystem 50 (FIG. 12) to emit the blue light beam Lb1 from the guide surface 100A of the optical disc 100. At this time, the focus Fb1 of the blue light beam Lb1 is placed on the rear side of the target track because the beam Lb1 is condensed by the objective lens 38 whose position is controlled.

The controller 21 suppresses the output power of the laser diode 51 during reading, thus preventing erroneous erasure of the recording mark RM due to the blue light beam Lb1.

Additionally, the controller 21 adjusts the depth d1 of the focus Fb1 (FIG. 10) to the target depth by adjusting the position of the movable lens 61 in the relay lens 60. As a result, the focus Fb1 of the blue light beam Lb1 is aligned to the target mark position.

The controller 21 controls the shutter 71 of the recording light-illuminated surface optical subsystem 70 (FIG. 13) to block the blue light beam Lb2, thus preventing the blue light beam Lb2 from being directed at the optical disc 100.

That is, the optical pickup 26 emits only the blue light beam Lb1 as so-called reference light to the recording mark RM recorded in the target mark position within the recording layer 101 of the optical disc 100. Correspondingly, the recording mark RM acts as a hologram and produces the readout blue light beam Lb3 acting as so-called readout light on the side of the guide surface 100A. At this time, the guide surface information optical subsystem 50 detects the readout blue light beam Lb3 and creates a detection signal corresponding to the results of the detection.

Thus, the controller 21 of the optical disc drive 20 produces the readout blue light beam Lb3 from the recording mark RM recorded at the target mark position in the recording layer 101 of the optical disc 100. By receiving this light beam, it is possible to detect that the recording mark RM is recorded.

Where the recording mark RM is not recorded at the target mark position, the readout blue light beam Lb3 is not produced from the target mark position and, therefore, the optical disc drive 20 causes the guide surface information optical subsystem 50 to create a detection signal indicating that the readout blue light beam Lb3 has not been received.

Correspondingly, the signal processor 23 recognizes whether or not the readout blue light beam Lb3 has been detected based on the detection signal, i.e., as value 1 or 0, and creates readout information based on the result of the recognition.

Consequently, the optical disc drive 20 can recognize whether value "1" or "0" is recorded in the target mark position by receiving the readout blue light beam Lb3 when the recording mark RM is formed in the target mark position within the recording layer 101 of the optical disc 100 and by not receiving the readout blue light beam Lb3 when the recording mark RM is not formed in the target mark position. As a result, the information recorded in the recording layer 101 of the disc 100 can be read.

Figure 3:
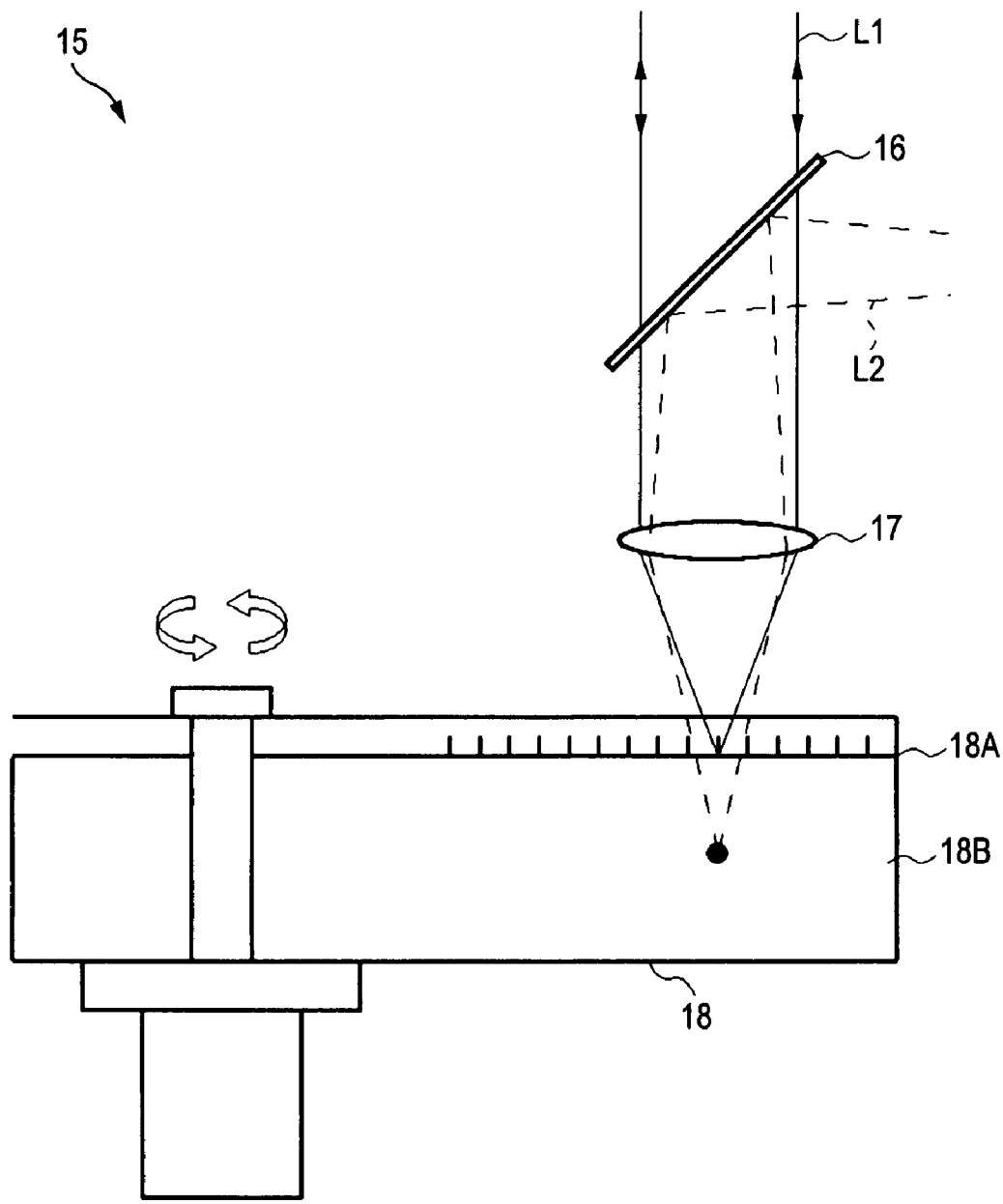
FIG. 3 is a schematic representation showing the structure of an optical disc drive using two kinds of light beams.

(1-5) Tilt of Optical Disc and Correction of Recording Position (1-5-1) Fundamental Principles Where the optical disc 100 is tilted in the optical disc drive 20 in the same way as in the case of the aforementioned optical disc drive 15 (FIG. 3), there is the possibility that the recording mark RM may not be recorded correctly in the desired recording mark (i.e., the target mark position) and that information may not be correctly read from the recording mark RM in the target mark position.

Figure 4A:
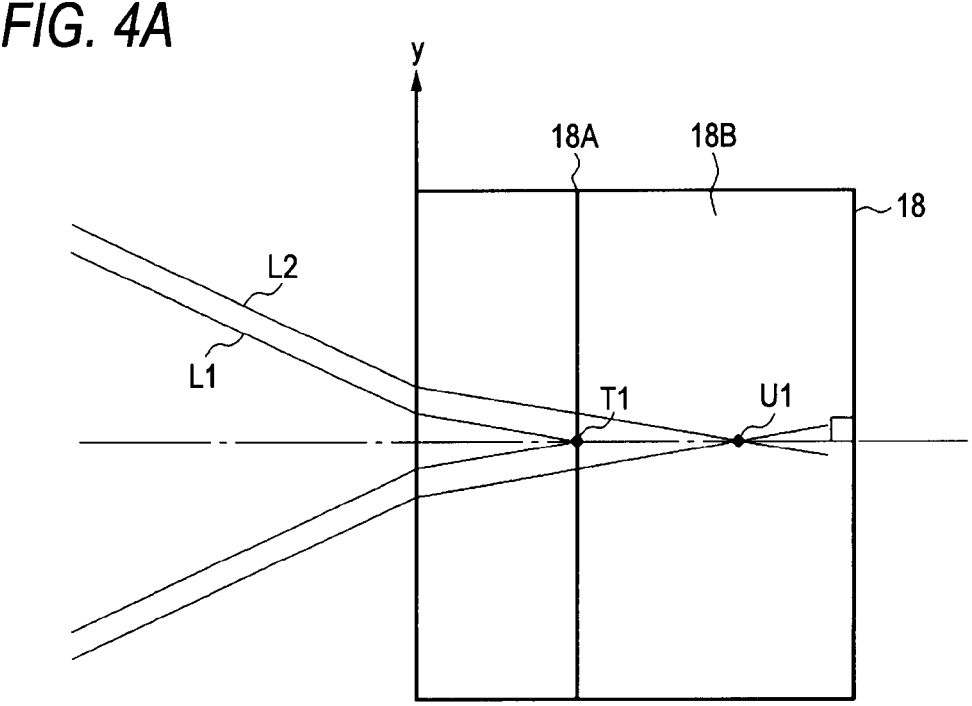
FIGS. 4A and 4B show schematic representations illustrating tilt of an optical disc and deviation of the beam irradiation position.
Figure 15A:
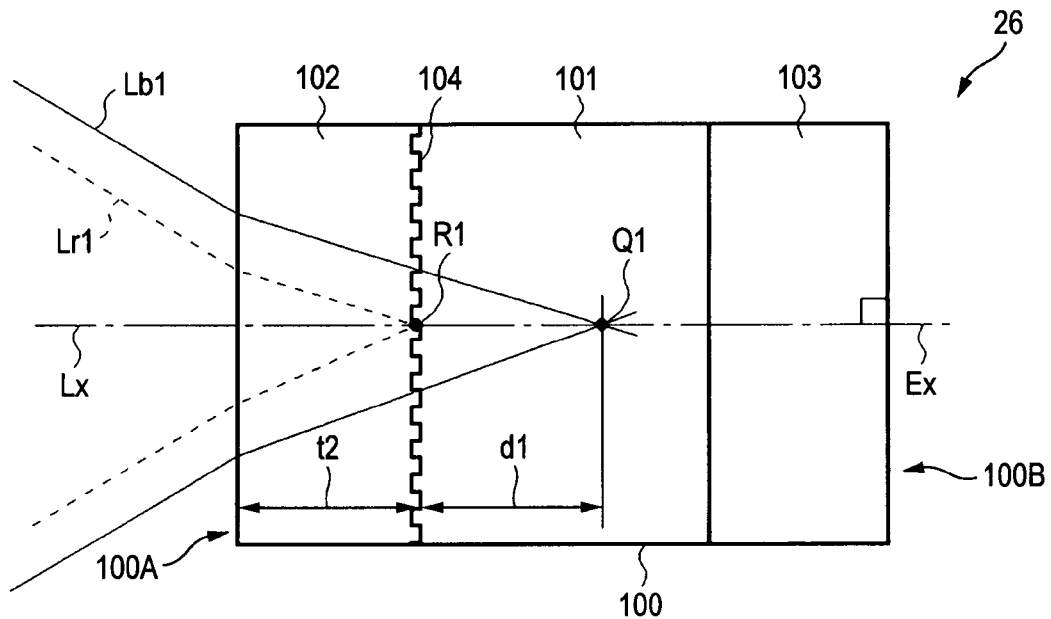
FIGS. 15A and 15B are schematic representations illustrating tilt of an optical disc and deviation of the focal position.

For example, in FIG. 15A corresponding to FIG. 4A, when the optical pickup 26 of the optical disc drive 20 focuses the red light beam Lr1 at a point R1 corresponding to the target track in the reflective transmissive film 104 under an ideal state where the optical disc 100 is not tilted, the pickup brings the blue light beam Lb1 to a focus at a point Q1 that is a target mark position within the recording layer 101.

In this case, the optical pickup 26 brings the red light beam Lr1 to a focus at the point R1 corresponding to the point Q1 in order to achieve the object, i.e., the blue light beam Lb1 is focused at the point Q1 being the target mark position.

At this time, the straight line passing through the points R1 and Q1, i.e., the optical axis Lx, is perpendicular to the guide surface 100A and recording light-illuminated surface 100B of the optical disc 100. In the following description, the line normal to the guide surface 100A and to the recording light-illuminated surface 100B, i.e., the straight line parallel to the optical axis Lx under the ideal state, is referred to as the normal line Ex to the optical disc 100.

Figure 4B:
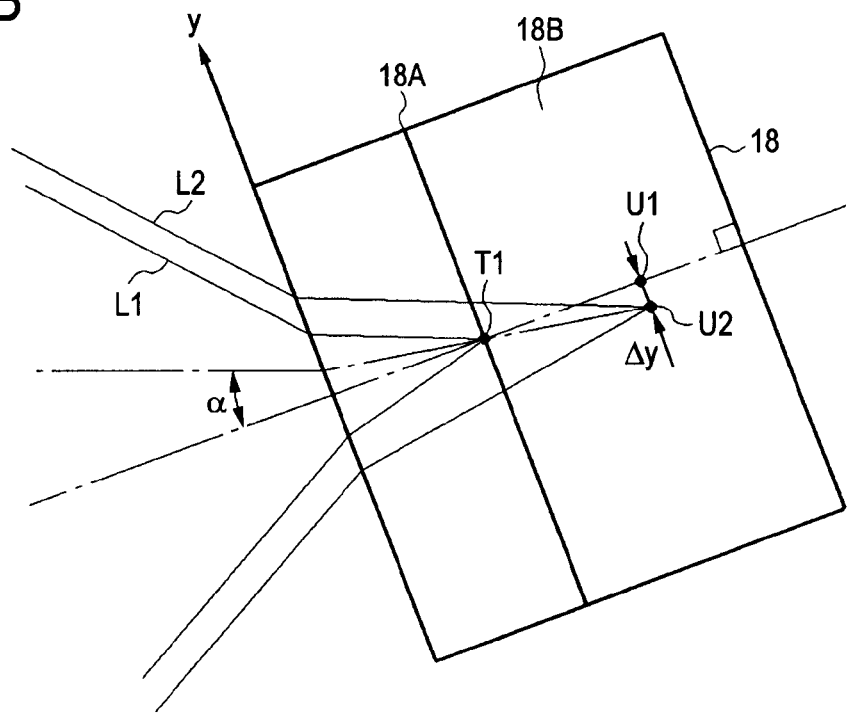
Figure 15B:
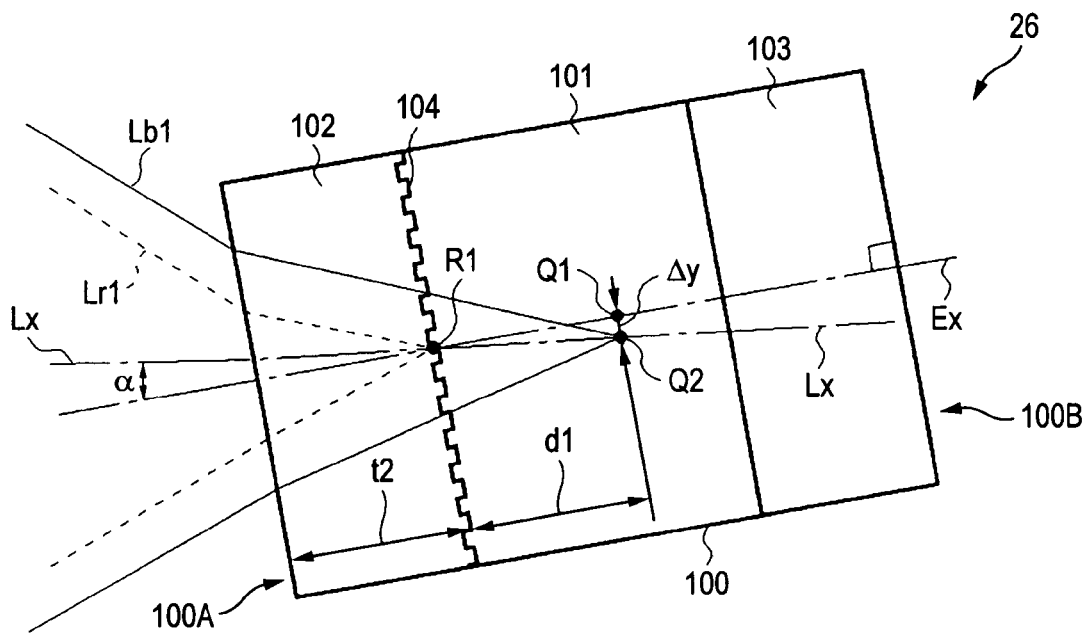

The optical disc 100 may wobble. For this reason, the disc may be tilted through a given angle α in a radial direction from the ideal state. That is, a radial tilt may occur. In this case, as shown in FIG. 15B corresponding to FIG. 4B, the optical pickup 26 causes the red light beam Lr1 and the blue light beam Lb1 to enter while tilting the optical axis Lx of the beams Lr1 and Lb1 at the angle α to the optical disc 100.

In this case, the optical axis Lx is refracted at the guide surface 100A of the optical disc 100 but the refraction angle obtained at this time is different from the tilt angle α because of the refractive index of the substrate 102. Therefore, after the refraction, the optical axis ceases to be parallel to the normal line EX to the optical disc 100.

As a result, when the focus Fr1 of the red light beam Lr1 is aligned to the point R1, the optical pickup 26 places the focus Fb1 of the blue light beam Lb1 into a point Q2 that is at a distance of Δy from the point Q1. It may not be possible to focus the blue beam at the point Q1 that is the original target mark position.

Accordingly, the optical disc drive 20 calculates the tilt angle α of the optical disc 100 based on the focus error signals SFEra and SFErb, and corrects the irradiation position of the blue light beam Lb1 according to the tilt angle α.

(1-5-2) Detection of Tilt of Optical Disc

In practice, the optical pickup 26 of the optical disc drive 20 emits the red light beam Lr1 including three light beams (subbeams) to the reflective transmissive film 104 of the optical disc 100 as shown in FIG. 10, and detects the reflected red light beams Lr2 one by one by the detection regions of the photodetector 43 (FIG. 11).

The signal processor 23 (FIG. 6) calculates the focus error signals SFEra and SFErb according to Eqs. (4) and (5), using the results of the detection of the subbeams of the reflected red light beams Lr2 made by the photodetector 43 as described previously.

When the optical disc 100 is in an ideal state (i.e., it is nottilted), the value of the difference between the focus error signals SFEra and SFErb is 0. On the other hand, when the disc 100 is tilted in a radial direction unlike the ideal state, the value of the difference varies according to the tilt angle α.

The optical disc drive 20 estimates the tilt angle α of the optical disc 100 in the radial direction based on the differential value between the focus error signals SFEra and SFErb.

In particular, the drive controller 22 (FIG. 6) calculates a skew value SKW as a value indicating the magnitude of the tilt angle α according to the following Eq. (10).

$$SKW = SFEra - SFErb + OF \quad (10)$$

where the offset value OF is a correcting value for setting the skew value SKW to 0 when the tilt angle α of the optical disc 100 in the radial direction has a value of 0.

Then, as shown in the following Eq. (11), the drive controller 22 calculates a corrective tracking error signal STErc by multiplying the skew value SKW by a given coefficient k and adding the product to the tracking error signal STEr calculated from Eq. (6).

$$STErc = STEr + k \cdot SKW \quad (11)$$

where the coefficient k is so set that the product (k·SKW) of the skew value SKW and the coefficient k is equal to a value obtained by converting the distance Δy from the point Q1 to the point Q2 shown in FIG. 15B into a tracking error signal.

The drive controller 22 varies the coefficient k according to the depth of the target mark position occurring at this time, i.e., according to the target depth. This operation is performed to cope with the fact that the distance Δy that is the amount of deviation at the tilt angle α varies according to the target depth (in this case, corresponds to the depth d1 of the focus Fb1 of the blue light beam Lb1) because of a geometric relationship.

In practice, measurements are previously made under the condition where the optical disc 100 is actually tilted. An appropriate coefficient k corresponding to the target depth is calculated. Values of the coefficient k corresponding to various values of the target depth are stored as a table in a storage portion (not shown) by the drive controller 22.

The drive controller 22 creates a tracking drive signal STDr based on the corrective tracking error signal STErc instead of the tracking error signal STEr, and supplies the created signal STDr to the two-axis actuator 38A.

Figure 16:
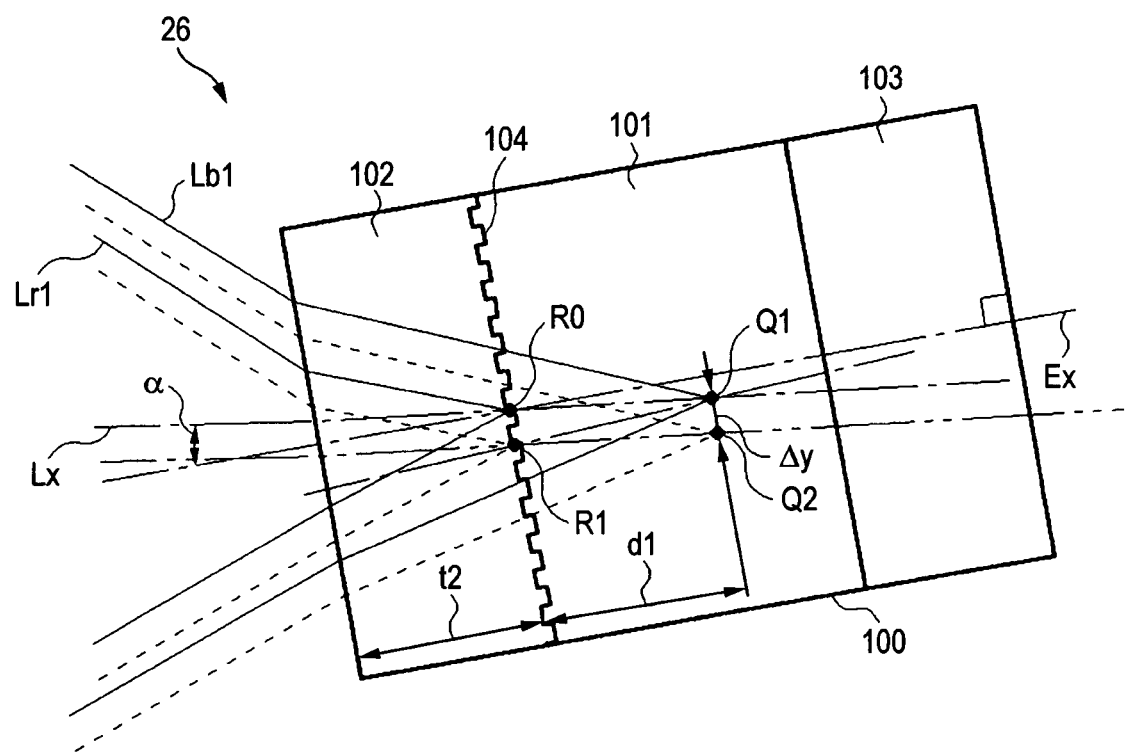
FIG. 16 is a schematic representation illustrating correction of the focal positions of red and blue light beams.

Consequently, the optical pickup 26 moves the position of the objective lens 38 based on the tracking drive signal STDr as shown in FIG. 16 to bring the focus Fr of the red light beam Lr1 not into the point R1 but into the point R0. In FIG. 16, the red light beam Lr1 not yet moved is indicated by the broken line. The moved red light beam Lr1 is indicated by the solid line.

This means that if the target track is at address "15,000", for example, the drive controller 22 provides such control that the focus Fr1 is intentionally brought to address "14,900". That is, the drive controller 22 intentionally corrects the focus Fr of the red light beam Lr1 to the point R0 different from the target track instead of the point R1 being the target track.

Concomitantly, the blue light beam Lb1 is focused not to the point Q2 but to the point Q1, i.e., the target mark position, according to the position of the objective lens 38.

Where information is recorded on the optical disc 100, in order to control the objective lens 79 and galvano mirror 78 such that the focus Fb2 of the blue light beam Lb2 is aligned to the focus Fb1 of the blue light beam Lb1, the drive controller 22 can also focus the blue light beam Lb2 at the target mark position.

In this way, the drive controller 22 corrects the tracking drive signal STDr according to the tilt angle α of the optical disc 100, thus moving the objective lens 38 a distance corresponding to the tilt angle α of the optical disc 100 in the tracking direction. As a result, the blue light beam Lb1 is focused at the original target mark position.

(1-6) Operation and Advantages

In the structure described so far, in the case where information is recorded on the optical disc 100 or read from it, the optical disc drive 20 causes the guide surface position-controlling optical subsystem 30 (FIG. 7) to emit the red light beam Lr1 from the guide surface 100A of the optical disc 100. Based on the results of the detection of the red light beam Lr2 that is the reflected light, the drive controller 22 provides focus control and tracking control (i.e., position control) of the objective lens 38. This causes the focus Fr of the red light beam Lr1 to follow the target track.

Furthermore, the controller 21 causes the guide surface information optical subsystem 50 (FIG. 9) to emit the blue light beam Lb1 from the guide surface 100A of the optical disc 100 via the objective lens 38 whose position is controlled.

On the other hand, the drive controller 22 calculates the skew value SKW indicating the magnitude of the tilt angle α of the optical disc 100 according to Eq. (10), based on the focus error signals SFEra and SFErb. Furthermore, the drive controller 22 calculates the corrective tracking error signal STErc according to Eq. (11) using the skew value SKW, corrects the tracking drive signal STDr based on the calculated signal, and controls the position of the objective lens 38.

Consequently, the drive controller 22 intentionally corrects the focus Fr1 of the red beam Lr1 to a position shifted from the target track by the objective lens 38. As a result, the blue light beam Lb1 can be focused at the target mark position by the objective lens 38.

Accordingly, if the optical disc 100 is tilted through angle α in a radial direction, the optical pickup 26 can focus the blue light beam Lb1 at the target mark position by correcting the irradiation position of the red light beam Lr1 according to the tilt angle α. That is, the optical disc drive 20 can record the recording mark RM at the target mark position or produce readout light from the target mark position by the recording mark RM.

In this case, the drive controller 22 controls the position of the objective lens 38 by correcting the tracking drive signal STDr according to the skew value SKW. That is, the blue light beam Lb1 is focused at the target mark position by utilizing the existing tracking control mechanism. Therefore, it is not necessary to provide a separate optical mechanism for tilting the optical axis of the blue light beam Lb1. It is possible to cope with tilt of the optical disc 100 without complicating the structure of the optical pickup 26.

The drive controller 22 varies the coefficient k according to the depth (target depth) of the target mark position and so the controller can appropriately correct the tracking drive signal STDr according to the target depth. Because the focus Fr1 of the red light beam Lr1 can be moved an appropriate amount of correction from the target track, the blue light beam Lb1 can be focused at the target mark position at high accuracy.

Where information is recorded on the optical disc 100, the drive controller 22 controls the objective lens 79 and galvano mirror 78 such that the focus Fb2 of the blue light beam Lb2 is aligned to the focus Fb1 of the blue light beam Lb1. Therefore, the drive controller 22 can focus the blue light beam Lb2 at the target mark position simply by focusing the blue light beam Lb1 at the target mark position irrespective of the tilt angle α of the optical disc 100 without providing any special control of the blue light beam Lb2.

According to the structure described so far, the drive controller 22 of the optical disc drive 20 intentionally corrects the focus Fr1 of the red light beam Lr1 to a position shifted from the target track by calculating the skew value SKW indicative of the magnitude of the tilt angle α of the disc 100 based on the focus error signals SFEra and SFErb and controlling the position of the objective lens 38 in the tracking direction using the product of the skew value SKW and the coefficient k. As a result, the blue light beam Lb1 can be focused at the target mark position by the objective lens 38.

(2) Second Embodiment

Figure 17:
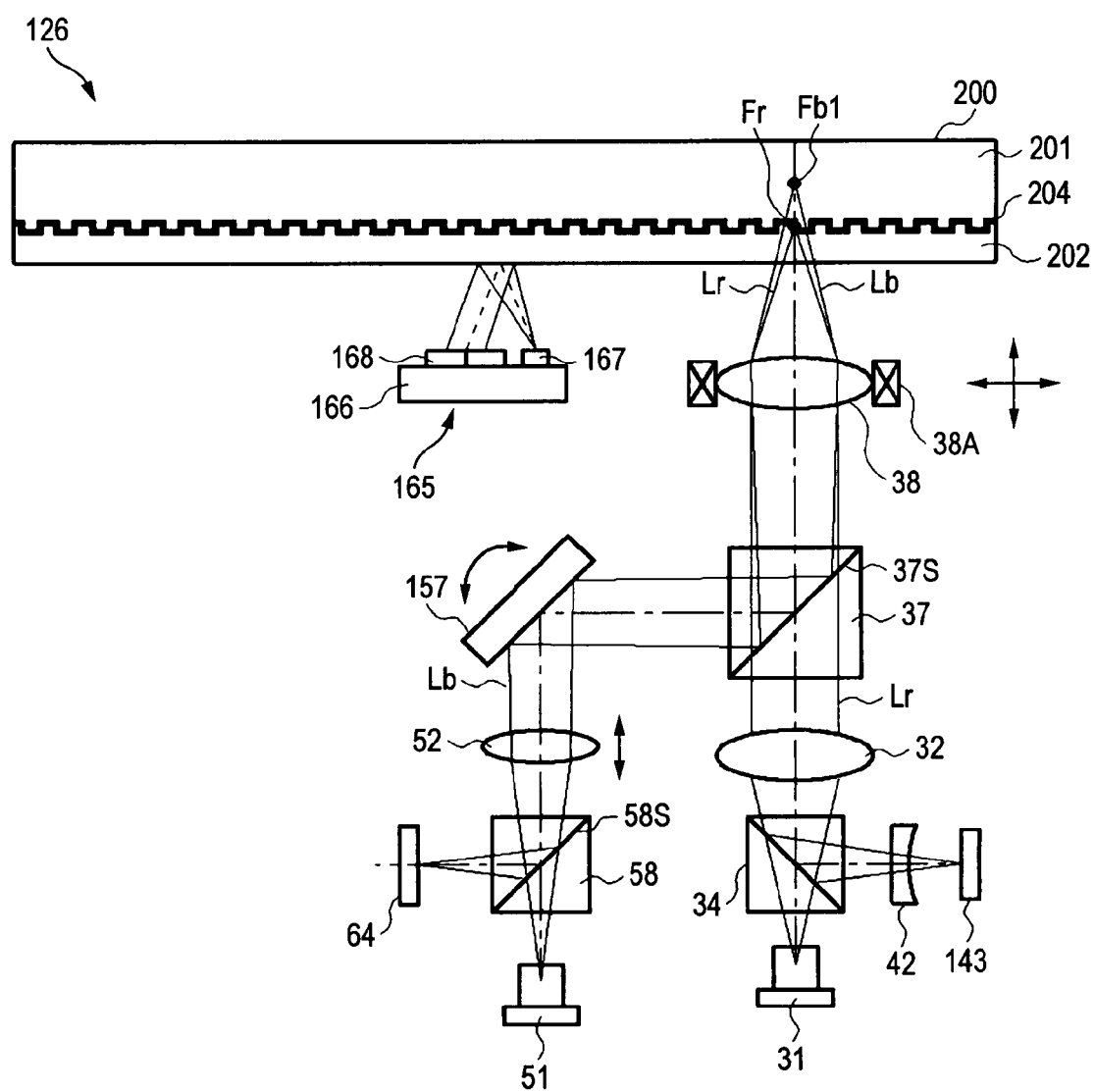
FIG. 17 is a schematic representation showing the structure of an optical pickup according to a second embodiment of the invention.

As shown in FIG. 17, where the portions corresponding to their counterparts of FIG. 8 are indicated by the same reference numerals as in FIG. 8, an optical disc drive, 120, according to a second embodiment of the present invention emits a light beam only from one side of an optical disc 200 to provide tracking control and focus control and perform recording and reading of information in the same way as the related-art optical disc drive 15 described above.

(2-1) Structure of Optical Disc

The optical disc 200 is made up of a substrate 202 and a recording layer 201 bonded together. The substrate forms abase. The recording layer 201 can record information therein. A reflective transmissive film 204 that reflects the red light beam is sandwiched between the substrate 202 and the recording layer 201.

The recording layer 201 can record information by being illuminated with a recording blue light beam having a given amount of light. In practice, a given recording mark RM is recorded at the focus of the blue light beam. The recording mark RM produces a readout blue light beam when illuminated with relatively weak blue light beam Lb.

The substrate 202 and reflective transmissive film 204 are configured similarly to the substrate 102 and reflective transmissive film 104, respectively, of the optical disc 100 according to the first embodiment. That is, a spiral track forming a guide groove for tracking servo is formed in the reflective transmissive film 204.

When the focus Fr of the red light beam Lr1 for position control hits the target track on the optical disc 200, the focus Fb of the blue light beam Lb for information recording is located at the target mark position. As a result, the recording mark RM is recorded as information. Readout light from the recording mark RM is read as information.

(2-2) Structure of Optical Disc Drive

The optical disc drive 120 (FIG. 6) is similar to the optical disc drive 20 except that the drive 120 has a drive controller 122 and an optical pickup 126 instead of the drive controller 22 and optical pickup 26 of the disc drive 20.

As shown in FIG. 17, the optical pickup 126 is somewhat similar in structure to the optical pickup 26 (FIG. 8). That is, a laser diode 31 emits a red light beam Lr1 to a non-polarizing beam splitter 34, the beam being divergent light having a wavelength of about 660 nm.

The non-polarizing beam splitter 34 transmits a given ratio of the red light beam Lr1 and passes it into a collimator lens 32. The collimator lens 32 converts the red light beam Lr1 into collimated light which is passed into an objective lens 38 via a dichroic prism 37.

The objective lens 38 condenses the red light beam Lr1 and passes it onto the optical disc 200. The lens 38 receives the red light beam Lr2 that is reflection of the red light beam Lr1 from the reflective transmissive film 204. The objective lens 38 converts the beam from divergent light into collimated light.

The reflected red light beam Lr2 is converted into converged light by the collimator lens 32 via the dichroic prism 37 and passed into the non-polarizing beam splitter 34.

The non-polarizing beam splitter 34 reflects a part of the reflected red light beam Lr2. Astigmatism is then given to the reflected beam by a cylindrical lens 42. The reflected red light beam Lr2 is passed into a photodetector 143.

Figure 18:
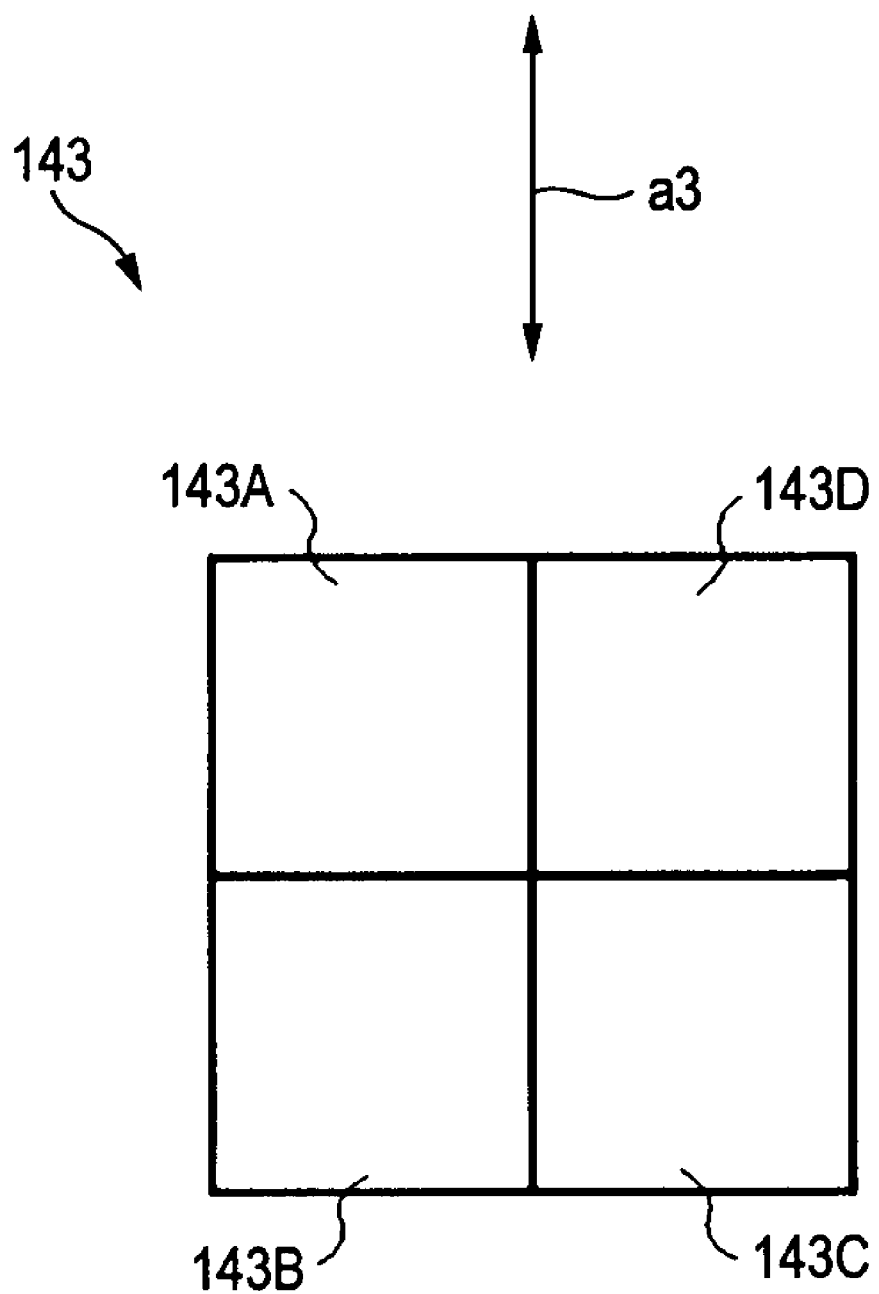
FIG. 18 is a schematic representation showing the structure of detection regions of a photodetector.

As shown in FIG. 18, the photodetector 143 corresponds to central four detection regions 43A-43D of the photodetector 43 (FIG. 11) and has detection regions 143A, 143B, 143C, and 143D. The direction indicated by the arrow a3 (the vertical direction in the figure) corresponds to the direction of motion of the track when the red light beam Lr1 is directed at the reflective transmissive film 204 (FIG. 17).

The photodetector 143 detects parts of the reflected red light beam Lr2 by the detection regions 143A-143D in the same way as the photodetector 43, creates detection signals SDAr, SDBr, SDCr, and SDDr corresponding to the detected amounts of light, and sends the signals to the signal processor 23 (FIG. 6).

The signal processor 23 calculates the focus error signal SFEr and tracking error signal STEr according to the above-described Eqs. (3) and (6) and supplies the calculated signals to the drive controller 122.

The drive controller 122 creates a focus drive signal SFDr based on the focus error signal SFEr in the same way as the first embodiment, supplies the focus drive signal SFDr to the two-axis actuator 38A, and provides feedback control (i.e., focus control) of the objective lens 38 such that the red light beam Lr1 is focused onto the reflective transmissive film 204 of the optical disc 200.

The drive controller 122 creates the tracking drive signal STDr based on the tracking error signal STEr and supplies the drive signal STDr to the two-axis actuator 38A to thereby provide feedback control (i.e., tracking control) of the objective lens 38 such that the red light beam Lr1 is focused at the target track in the reflective transmissive film 204 of the optical disc 200.

The laser diode 51 emits a blue light beam Lb1 that is divergent light having a wavelength of about 405 nm, and passes the beam into the polarizing beam splitter 58. The splitter 58 transmits the blue light beam Lr1 according to the direction of polarization of the blue beam Lr1, and passes the transmitted beam into the collimator lens 52.

The collimator lens 52 converts the blue light beam Lb1 into divergent light having a relatively small angle of divergence. The beam is then reflected by the galvano mirror 157 and passed into the dichroic mirror 37.

The galvano mirror 157 can vary the angle of its mirror surface. The optical axis of the blue light beam Lb1 obtained after the reflection can be varied by adjusting the angle of the mirror surface under control of the drive controller 122 (FIG. 6).

The dichroic prism 37 reflects the blue light beam Lb1 by its reflective transmissive surface 37S according to the wavelength of the blue light beam Lb1, and passes the beam into the objective lens 38. The objective lens 38 focuses the blue light beam Lb1 into the recording layer 201 of the optical disc 200 while the position of the red light beam Lr1 is controlled such that it can be focused onto the target track.

The drive controller 122 moves the collimator lens 52 in the direction of the optical axis, thus adjusting the angle of divergence of the blue light beam Lb1 incident on the objective lens 38. Thus, the distance (i.e., the depth of the focus Fb1) between the focus Fb1 of the blue light beam Lb1 and the reflective transmissive film 204 can be adjusted.

Where the blue light beam Lb1 is relatively intense, the recording mark RM is recorded as information at the position of the focus Fb1 of the blue light beam Lb1 in the recording layer 201. Where the blue light beam Lb1 is relatively weak, a readout blue light beam Lb3 is produced from the recording mark RM at the position of the focus Fb1 of the blue light beam Lb1 within the recording layer 201. The produced beam Lb3 is passed into the objective lens 38.

After converted into converged light by the objective lens 38, the readout blue light beam Lb3 is reflected successively by the reflective transmissive surface 37S and galvano mirror 157 of the dichroic prism 37 and passed into the collimator lens 52. The readout blue light beam Lb3 is so adjusted at the stage when it is passed into the collimator lens 52 that the direction of polarization is made different by 90° from the blue light beam Lb1 by a ½ wave plate or ¼ wave plate (not shown).

The collimator lens 52 condenses the readout blue light beam Lb3 and passes it into the polarizing beam splitter 58. The splitter 58 reflects the readout blue light beam Lb3 by its reflective transmissive surface 58S according to the direction of polarization of the readout blue beam Lb3, and directs the reflected beam at the photodetector 64.

The photodetector 64 detects the amount of light of the readout blue light beam Lb3, creates a readout detection signal SDp according to the detected amount of light, and supplies the created signal SDp to the signal processor 23 (FIG. 6). Correspondingly, the signal processor 23 creates readout information by processing the readout detection signal SDp in a given manner (e.g., demodulation or decoding), and supplies the readout information to the controller 21.

The optical pickup 126 has a tilt sensor 165 for detecting the tilt of the optical disc 100 in a radial direction (i.e., from inside toward the outside of the optical disc 100 or vice versa).

The tilt sensor 165 has a laser diode 167 on the side of a base portion 166 which faces the optical disc 200. The laser diode 167 emits a sensor light beam that is divergent light.

At this time, the tilt sensor 165 emits the sensor light beam at a given angle to the optical disc 200. The sensor light beam reflected at the surface of the optical disc 200 is received by the photodetector 168.

The photodetector 168 has illuminated portions hit by the sensor light beam, and the illuminated portions have two detection regions 168A and 168B (not shown) split in the direction that is parallel to the track formed in the reflective transmissive film 204.

The photodetector 168 detects parts of the sensor light beam by its detection regions 168A and 168B, creates detection signals SDAs and SDBs according to the detected amounts of light, and sends the signals to the drive controller 122.

In practice, where the radial tilt angle αx of the optical disc 200 is varied in the optical disc drive 120, the optical axis of the sensor light beam reflected at the surface of the disc 200 is varied. Consequently, the ratio between the detection signals SDAs and SDBs varies.

Accordingly, the drive controller 122 recognizes the tilt angle α of the optical disc 200 by using the detection signals SDAs and SDBs and can provide control according to the tilt angle α.

(2-3) Tilt of Optical Disc and Correction of Recording Position

Also, in this optical disc drive 120 according to the second embodiment, there is the possibility that the focus Fb1 of the blue light beam Lb1 deviates from the target mark position due to tilt of the optical disc 200 in a radial direction as shown in FIGS. 15A and 15B in the same way as the optical disc drive 20 according to the first embodiment.

Accordingly, the optical disc drive 120 is designed to correct the irradiation position of the blue light beam Lb1 according to the tilt angle α of the optical disc 200 in the same way as the optical disc drive 20.

First, the optical disc drive 120 estimates the radial tilt angle α of the optical disc 100 based on the differential value between the detection signals SDAs and SDBs supplied from the tilt sensor 165.

In particular, the drive controller 122 (FIG. 6) calculates a skew value SKW as a value indicating the magnitude of the tilt angle α according to the following Eq. (12).

$$SKW = SDAs - SDBs + OF \qquad (12)$$

where the offset value OF is a correcting value for setting the skew value SKW to a value of 0 when the radial tilt angle α of the optical disc 100 is 0.

The drive controller 122 multiplies the skew value SKW by a given coefficient j as given by the following Eq. (13), thus creating a drive signal SGM for driving the galvano mirror 157.

$$SGM = j \cdot SKW \qquad (13)$$

The drive controller 122 adjusts the angle of the mirror surface of the galvano mirror 157 by supplying the drive signal SGM to the galvano mirror 157, thus varying the optical axis of the blue light beam Lb1.

Figure 19:
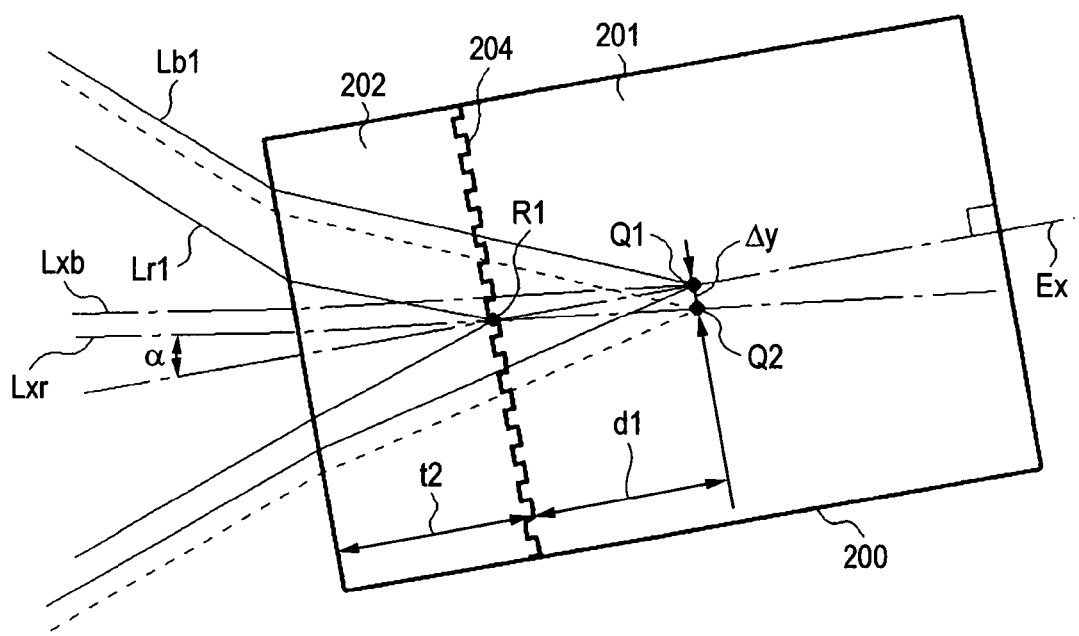
FIG. 19 is a schematic representation illustrating correction of the focal position of a blue light beam.

As shown in FIG. 19, the optical pickup 126 thus can shift the optical axis Lxb of the blue light beam Lb1 from the optical axis Lxr of the red light beam Lr1 within the optical disc 200. The focus Fb1 of the blue light beam Lb1 can be aligned to a point Q1 that is the target mark position.

In the second embodiment, the optical axis of the blue light beam Lb1 is corrected by adjusting the angle of the mirror surface of the galvano mirror 157. Therefore, on principle, it is considered that it is not fundamentally necessary to vary the coefficient j in Eq. (13) according to the target depth.

However, in the optical pickup 126, as shown in FIG. 17, the blue light beam Lb1 incident on the galvano mirror 157 is divergent light and so there is the possibility that the optimum amount of angle by which the mirror surface is adjusted may be different according to the divergent angle (i.e., the target depth) occurring at this time.

Accordingly, the drive controller 122 may vary the coefficient j according to the target depth in the same way as the coefficient k in the first embodiment. In this case, the optical disc 200 is previously tilted in practice. Under this condition, measurements are made. The drive controller 122 calculates the appropriate coefficient j corresponding to the target depth. The values of the coefficient j corresponding to various values of the target depth are stored as a table in a storage portion (not shown).

In this way, the drive controller 122 corrects the optical axis of the blue light beam Lb1 by adjusting the angle of the mirror surface of the galvano mirror 157 according to the tilt angle α of the optical disc 200. As a result, the blue light beam Lb1 is focused onto the original target mark position.

(2-4) Operation and Advantages

Because of the structure described so far, where information is recorded on or read from the optical disc 200, the optical disc drive 120 emits the red light beam to the reflective transmissive film 204 of the disc 200. The drive controller 122 provides focus control and tracking control (i.e., position control) of the objective lens 38 based on the results of detection of the reflected red light beam Lr2. The focus Fr of the red light beam Lr1 is made to follow the target track.

The controller 21 emits the blue light beam Lb1 to the optical disc 200 via the objective lens 38 whose position is controlled.

Meanwhile, the drive controller 122 calculates the skew angle SKW indicative of the magnitude of the tilt angle α of the optical disc 200 according to Eq. (12), based on the detection signals SDAs and SDBs supplied from the tilt sensor 165. The drive controller 122 creates a drive signal SGM according to Eq. (13), using the skew value SKW, and supplies the drive signal SGM to the galvano mirror 157, thus adjusting the angle of its mirror surface.

Consequently, the drive controller 122 can correct the optical axis of the blue light beam Lb1 and bring the axis to a focus onto the target mark position while the focus Fr1 of the red light beam Lr1 is aligned to the target track by the objective lens 38.

Therefore, if the optical disc 200 is tilted at angle α in a radial direction, the optical pickup 126 can focus the blue light beam Lb1 at the target mark position by correcting the optical axis of the blue light beam Lb1 according to the tilt angle α of the disc 200. Therefore, the recording mark RM can be recorded at the target mark position and produce readout light from the target mark position owing to the recording mark RM.

In this case, the drive controller 122 corrects the optical axis of the blue light beam Lb1 according to the skew value SKW and, therefore, with respect to the red light beam Lr1, focus control and tracking control may be normally provided without the need to take account of the radial tilt angle α. Any complex computational processing that would be necessary to correct the amount of correction for tracking can be omitted.

According to the structure described so far, the drive controller 122 of the optical disc drive 120 calculates the skew value SKW indicative of the magnitude of the tilt angle α of the optical disc 200 based on the detection signals SDAs and SDBs from the tilt sensor 165, and can correct the optical axis of the blue light beam Lb1 by adjusting the angle of the mirror surface of the galvano mirror 157 by the drive signal SGM based on the skew value SKW. Thus, the blue light beam Lb1 can be focused at the target mark position.

(3) Other Embodiments

In the above-described embodiments, a case is described where the recording mark RM is recorded by illuminating both sides of the optical disc 100 with the blue light beams Lb1 and Lb2. Also, a case is described where one surface of the optical disc 200 is illuminated with the blue light beam Lb1 to record the recording mark RM. The present invention is not limited to these cases. For example, the present invention may also be applied to the case where one side of an optical disc is illuminated with two blue light beams Lb1 and Lb2 to record the recording mark RM.

Figure 20:
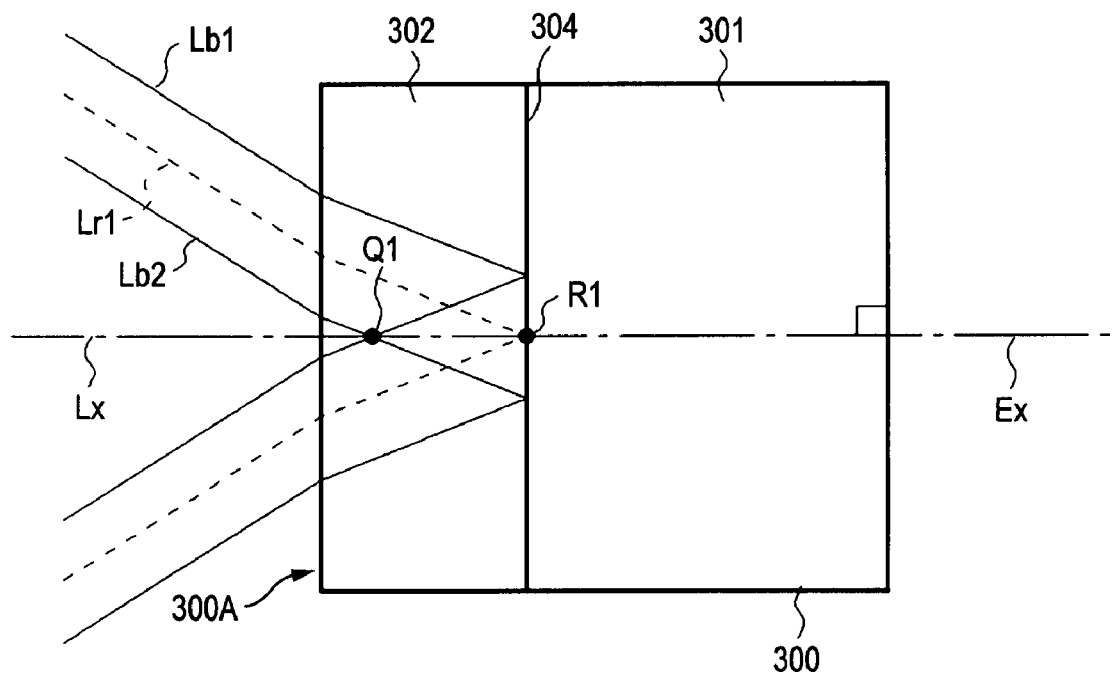
FIG. 20 is a schematic representation illustrating another embodiment in which an optical disc is illuminated with light beams.

For example, as shown in FIG. 20, an optical disc 300 is composed of a substrate 302 and a recording layer 301 bonded together, the substrate forming a base. A hologram can be recorded in the recording layer 301. A reflective film 304 reflecting light beam is sandwiched between the substrate 302 and the recording layer 301. The surface on the side of the substrate 302 is hereinafter referred to as the recording surface 300A.

When information is recorded on the optical disc 300, the recording mark RM is recorded by making use of interference between the blue light beams Lb1 and Lb2. The beam Lb1 is entered from the recording surface 300A and reflected by the reflective film 304. The beam L2b is entered from the recording surface 300A.

Figure 21:
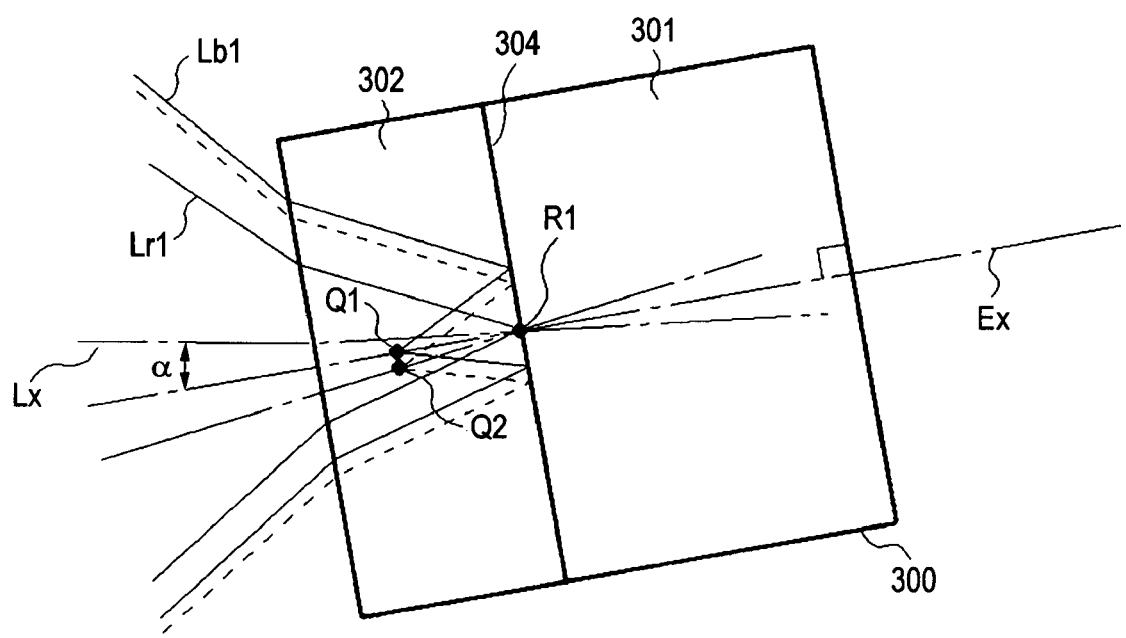
FIG. 21 is a schematic representation illustrating correction of the focal positions of light beams according to a further embodiment of the invention.

The reflective film 304 has a track in which spiral or coaxial guide grooves are arranged, in the same way as the reflective transmissive film 104 (FIG. 5B) of the optical disc 100. It is assumed that the track is used as a positional index when focus control and tracking control are provided.

Where the optical disc 300 is tilted through angle α in a radial direction, the blue light beam Lb1 passes through an optical path as indicated by the broken line as shown in FIG. 21 and is brought to a focus at a point Q2 deviating from the point Q1 that is a target mark position.

In this case, in the same way as in the second embodiment, the tilt angle α of the optical disc 300 is detected by the tilt sensor 165. The blue light beam Lb1 can be brought to a focus at the point Q1 being a target mark position by moving the optical axis of the blue light beam Lb1 according to the tilt angle α independent of the optical axis Lx of the red light beam Lr1.

Furthermore, in the above-described first embodiment, a case is described where the position of the objective lens 38 in the tracking direction in the optical disc drive 20 is corrected by a distance corresponding to the tilt angle α of the optical disc 100 and the blue light beam Lb1 is focused at the original target mark position by moving the focus Fr of the red light beam Lr1 and the focus Fb1 of the blue light beam Lb1. The present invention is not limited to this case. In the optical disc drive 20, the blue light beam Lb1 may be focused at the original target mark position by varying the optical axis of the blue light beam Lb1 without moving the focus Fr of the red light beam Lr1 as, for example, in the second embodiment.

In this case, the angle of the reflective surface of the movable mirror 57 is made adjustable, for example. The optical axis of the blue light beam Lb1 incident on the surface 55B of the polarizing beam splitter 55 may be slightly tilted via the ¼ wave plate 56 by varying the angle of the reflective surface under control of the controller 21.

Furthermore, in the above-described second embodiment, a case is described where the blue light beam Lb1 is brought to a focus at the original target mark position in the optical disc drive 120 by varying the optical axis of the blue light beam Lb1. The present invention is not limited to this case. In the optical disc drive 120, the position of the objective lens 38 in the tracking direction may be corrected by the distance corresponding to the tilt angle α of the optical disc 100, for example, as in the first embodiment, and the blue light beam Lb1 may be brought to a focus at the original target mark position by moving the focus Fr of the red light beam Lr1 and the focus Fb1 of the blue light beam Lb1. In this case, a fixed mirror may be used instead of the galvano mirror 157.

In addition, in the above embodiments, a case is described where the skew value SKW indicating the tilt angle α of the optical disc 100 or 200 in a radial direction is calculated based on the focus error signals SFEra and SFErb of the subbeams of the reflected red light beam Lr2 or on the detection signals SDAs and SDBs owing to the tilt sensor 165. The present invention is not limited to this case. For example, the skew value SKW indicating the tilt angle α may be calculated by various methods. One example is as follows. When the reflected red light beam Lr2 is received by the optical pickup 126, the skew value SKW is calculated by making use of the fact that a diffraction pattern is created by the shape of the track formed on the reflective transmissive film 204 and based on the deviation of the distribution of light amounts produced in the portion where the zeroth-order and the first-order light rays overlap in the diffraction pattern.

Furthermore, in the above-described first embodiment, a case is described where the reflective transmissive film 104 is formed between the recording layer 101 and the substrate 102 in the optical disc 100. The present invention is not limited to this case. For example, the reflective transmissive layer 104 may be formed between the recording layer 101 and the substrate 103 or other location such as inside of the substrate 102 or inside of the recording layer 101.

Additionally, in the above-described embodiments, a case is described where the optical beam (referred to as the position-controlling light beam) for position control of the objective lens 38 is a red light beam having a wavelength of about 660 nm and the light beam (referred to as the recording light beam) for forming the recording mark RM is a blue light beam having a wavelength of about 405 nm. The present invention is not limited to this case. For example, the position-controlling light beam and recording light beam may have arbitrary wavelengths.

In this case, the reflective transmissive film 104 or 204 may have such property that the film reflects the position-controlling light beam according to its wavelength and transmits the recording light beam according to its wavelength. The recording layer 101 may be made of a material responding to the wavelength of the recording light beam.

Where the wavelength of the recording light beam is modified, the size of the recording mark RM varies as shown in the above-described Eqs. (1) and (2). Therefore, it is desired to appropriately vary the distance p1 between recording marks RM, the distance p2 between the tracks, and the distance p3 between the mark recording layers.

Further, in the above-described embodiments, a case is described where so-called positive type recording is made. That is, the recording mark RM indicating the value of a unit of information 0 or 1 is recorded by forming a new microscopic hologram within the recording layer 101 of the optical disc 100. The present invention is not limited to this case. For example, so-called negative type recording may be made. That is, holograms may be previously formed substantially over the whole surface of the optical disc 100 in multiple layers at given intervals within the recording layer 101 of the optical disc 100. The hologram at the target mark position may be erased by focusing the blue light beams Lb1 and Lb2 having a given intensity at the target mark position. Thus, the value of a unit of information 0 or 1 is recorded.

Additionally, in the above-described embodiments, a case is described where the diameter of the optical disc 100 is set to about 120 mm, the thickness t1 of the recording layer 101 is set to about 0.3 mm, and the thicknesses t2 and t3 of the substrates 102 and 103, respectively, are set to about 0.6 mm. The present invention is not limited to this case. Other values may also be adopted. In this case, the optical characteristics of various optical components and their arrangement may be so set that the foci of the blue light beams Lb1 and Lb2 are brought to the position of the target mark while taking account of the thicknesses of the recording layer 101 and of the substrates 102, 103 and the refractive indices of various materials.

Still further, in the above embodiments, a case is described in which the optical disc drive 20 is constituted as one optical disc drive by the actuator 38A, objective lens 38, signal processor 23, and drive controller 22 (acting as the position controller), photodetector 43, signal processor 23, and drive controller 22 (acting as the tilt angle detector), and the drive controller 22 (acting as the focal position corrector). Also, a case is described in which the optical disc drive 120 is constituted as one optical disc drive by the actuator 38A, objective lens 38, signal processor 23, and drive controller 22 (acting as the position controller), the tilt sensor 165 and the drive controller 22 (acting as the tilt angle detector), and the drive controller 22 (acting as the focal position corrector). The present invention is not limited to these cases. An optical disc drive may be constituted by a position controller made of various circuit configurations, tilt angle detector, and focal position corrector.

The present invention can be used in an optical disc drive for recording large amounts of music contents or video contents or various kinds of data on an optical disc acting as a recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc drive for recording and/or reading information on and/or from an optical disc having at least one recording surface by bringing an information light beam to a focus at a target recording position on the recording surface of the disc by an objective lens, the optical disc having a reflective surface on which position-guiding elements for determining a position at which the information is recorded are formed, the optical disc drive comprising:

a position controller which controls the position of the objective lens based on the position-controlling light beam reflected by the reflective surface by condensing the position-controlling light beam by the objective lens such that the position-controlling light beam is brought to a focus at a target guide position on the reflective surface corresponding to the target recording position;

a tilt angle detector which detects tilt angle of the optical disc relative to optical axis of the position-controlling light beam; and a focal position corrector which makes a correction such that a focal position obtained when the information light beam is condensed by the objective lens is aligned to the target recording position according to the tilt angle and a target depth, said target depth being a distance from a reflection layer to a target recording layer.

2. An optical disc drive as set forth in claim 1, wherein the focal position corrector corrects the focal position of the information light beam by adjusting the optical axis of the information light beam according to the tilt angle and the target depth before the beam is incident on the objective lens.

3. An optical disc drive as set forth in claim 2, wherein the focal position corrector corrects the focal position of the information light beam by varying angle of a mirror according to the tilt angle and the target depth, the mirror being used to tilt the optical axis of the information light beam incident on the objective lens.

4. An optical disc drive as set forth in claim 2, wherein the optical disc has a plurality of the recording surfaces provided in layers, and wherein the focal position corrector corrects the focal position by adjusting the optical axis of the information light beam depending on one of the recording surfaces onto which the information light beam should be focused and also on the tilt angle and the target depth.

5. An optical disc drive as set forth in claim 1, wherein the focal position corrector makes a correction such that the focal position of the information light beam is aligned to the target recording position by correcting the position of the objective lens according to the tilt angle and the target depth and shifting the position-controlling light beam from the target guide position.

6. An optical disc drive as set forth in claim 5, wherein the focal position corrector corrects the position of the objective lens by adding a correcting value to a tracking control signal for providing tracking control for moving the objective lens inwardly or outwardly of the optical disc, the correcting value corresponding to the tilt angle and the target depth.

7. An optical disc drive as set forth in claim 1, wherein the tilt angle detector detects the tilt angle by computational processing using results of detection of reflection of a tilted detection light beam made by a given light-receiving element when the optical disc is illuminated with the detection light beam tilted at a given angle to the disc.

8. An optical disc drive as set forth in claim 7, wherein the tilt detection light beam includes plural light subbeams which are split from the position-controlling light beam and which are brought to a focus on the reflective surface of the optical disc via the objective lens, and wherein the tilt angle detector calculates plural amounts of focal deviations of the plural light subbeams from the reflective surface using results of reception of the light subbeams using the light-receiving element and detects the tilt angle based on the plural amounts of focal deviations.

9. An optical disc drive as set forth in claim 1, wherein the optical disc drive records standing waves on the recording surface by emitting first and second light beams from the same light source and focusing the first and second light beams to the target recording position from both sides of the optical disc by the objective lens and a second objective lens, respectively.

10. A method of controlling a focal position by bringing an information light beam to a focus at a target recording position on a recording surface of an information recording medium by an objective lens, the method comprising the steps of:

preparing the information recording medium having a reflective surface on which position-guiding elements for determining a position at which the information is recorded are formed;

bringing an information light beam to a focus on the recording surface by the objective lens;

controlling position of the objective lens such that the position-controlling light beam is brought to a focus at a target guide position on the reflective surface corresponding to the target recording position;

detecting tilt angle of the information recording medium relative to optical axis of the position-controlling light beam; and making a correction such that the focal position obtained when the information light beam is condensed by the objective lens is aligned to the target recording position according to the tilt angle and a target depth, said target depth being a distance from a reflection layer to a target recording layer.

* * * * *